United States Patent
Purkis

(10) Patent No.: US 11,346,172 B2
(45) Date of Patent: May 31, 2022

(54) THROUGH-BORE SPOOL APPARATUS

(71) Applicant: Well-Sense Technology Limited, Aberdeen (GB)

(72) Inventor: Daniel George Purkis, Dyce (GB)

(73) Assignee: WELL-SENSE TECHNOLOGY LIMITED, Aberdeen (GB)

( * ) Notice: Subject to any disclaimer, the term of this patent is extended or adjusted under 35 U.S.C. 154(b) by 5 days.

(21) Appl. No.: 16/960,985

(22) PCT Filed: Jan. 10, 2019

(86) PCT No.: PCT/GB2019/050068
§ 371 (c)(1),
(2) Date: Jul. 9, 2020

(87) PCT Pub. No.: WO2019/138236
PCT Pub. Date: Jul. 18, 2019

(65) Prior Publication Data
US 2020/0340319 A1  Oct. 29, 2020

(30) Foreign Application Priority Data
Jan. 10, 2018  (GB) ..................... 1800373

(51) Int. Cl.
*E21B 23/14*  (2006.01)
*E21B 17/00*  (2006.01)
(Continued)

(52) U.S. Cl.
CPC ............ *E21B 23/14* (2013.01); *E21B 17/003* (2013.01); *E21B 47/06* (2013.01); *E21B 47/07* (2020.05)

(58) Field of Classification Search
CPC ........ E21B 23/14; E21B 17/003; E21B 47/07; E21B 47/06; H02G 1/08
See application file for complete search history.

(56) References Cited

U.S. PATENT DOCUMENTS 1,522,868 A * 1/1925 Cruts .................... E21B 31/06
  294/65.5
3,904,840 A  9/1975 Kostelnicek
(Continued)

FOREIGN PATENT DOCUMENTS

GB  2119949 A  11/1983
GB  2389598 A  12/2003
(Continued)

OTHER PUBLICATIONS

International Search Report PCT/ISA/210 and Written Opinion of the International Searching Authority PCT/ISA/237 for International Application No. PCT/GB2019/050068 dated Mar. 29, 2019.
(Continued)

*Primary Examiner* — Brad Harcourt
(74) *Attorney, Agent, or Firm* — Harness, Dickey & Pierce, P.L.C.

(57) ABSTRACT

A through-bore spool apparatus for use in deploying multiple spoolable media in a bore is disclosed. The through-bore spool apparatus comprises a first spool comprising a first spool axis and a first spoolable medium wound around the first spool axis, and a second spool comprising a second spool axis and a second spoolable medium wound around the second spool axis. The first and second spoolable media are de-spoolable simultaneously from the respective first and second spools during movement of the through-bore spool apparatus along a bore.

19 Claims, 10 Drawing Sheets

(51) Int. Cl.
   *E21B 47/07*    (2012.01)
   *E21B 47/06*    (2012.01)

(56) References Cited

U.S. PATENT DOCUMENTS

| | | | |
|---|---|---|---|
| 4,739,947 A | 4/1988 | Anseel et al. | |
| 2002/0104662 A1* | 8/2002 | Dallas | E21B 33/068 |
| | | | 166/384 |
| 2003/0226667 A1* | 12/2003 | Hill | B65H 75/4402 |
| | | | 166/384 |
| 2007/0221386 A1* | 9/2007 | Rock | E21B 19/22 |
| | | | 166/379 |
| 2014/0196893 A1* | 7/2014 | Vigneaux | E21B 47/135 |
| | | | 166/250.07 |
| 2015/0167449 A1 | 6/2015 | Rodney | |

FOREIGN PATENT DOCUMENTS

| | | |
|---|---|---|
| WO | WO-2011/038862 A1 | 4/2011 |
| WO | WO-2017009671 A1 | 1/2017 |

OTHER PUBLICATIONS

Search Report for Intellectual Property Office Application No. GB1800373.1 dated May 30, 2018.
International Preliminary Report and Written Opinion for PCT/GB2019/050068 dated Jul. 23, 2020.

* cited by examiner

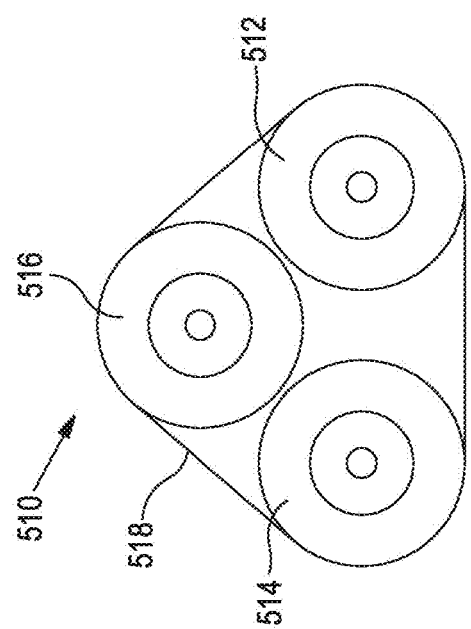
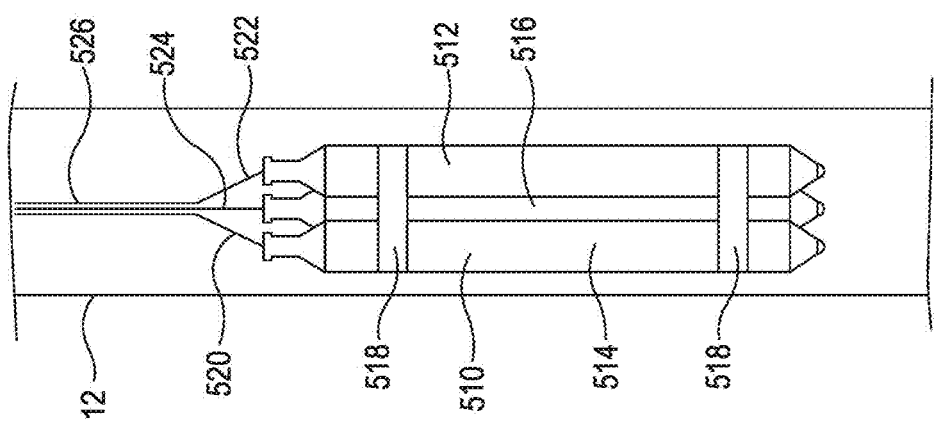

THROUGH-BORE SPOOL APPARATUS

CROSS-REFERENCE TO RELATED APPLICATIONS

This application is a national phase under 35 U.S.C. § 371 of PCT International Application No. PCT/GB2019/050068 which has an International filing date of Jan. 10, 2019, which claims priority to Intellectual Property Office Application No. GB 1800373.1, filed Jan. 10, 2018, the entire contents of each of which are hereby incorporated by reference.

FIELD

The present disclosure relates to a through-bore spool apparatus for use in deploying elongate media in a bore.

BACKGROUND

Many industries, such as the oil and gas industry, require the deployment of elongate media within a bore, for example a wellbore, to facilitate applications such as communication, sensing and the like.

In some examples it may be desirable to deploy electrical conductors in a bore. Optical fibres may also be deployed in bores, for example to facilitate sensing operations, such as distributed temperature sensing (DTS), distributed pressure sensing (DPS) and distributed acoustic sensing (DAS). Optical fibres may also be used for data communication to/from a bore. In many wellbore applications the optical fibre is deployed as an integral component of a completion string, and thus may be classified as a permanent installation. The costs of including a permanently installed optical fibre system can be significant, and there are also concerns over the longevity of such permanently installed systems.

SUMMARY

An aspect of the present disclosure relates to a spool apparatus, comprising:
  a first spool comprising a first spoolable medium; and
  a second spool comprising a second spoolable medium;
  wherein the first and second spoolable media are de-spoolable simultaneously from the respective first and second spools during movement of the through-bore spool apparatus along a bore.

An aspect of the present disclosure relates to a through-bore spool apparatus for use in deploying multiple spoolable media in a bore, the through-bore spool apparatus comprising:
  a first spool comprising a first spool axis and a first spoolable medium wound around the first spool axis; and
  a second spool comprising a second spool axis and a second spoolable medium wound around the second spool axis;
  wherein the first and second spoolable media are de-spoolable simultaneously from the respective first and second spools during movement of the through-bore spool apparatus along a bore.

The through-bore spool apparatus may thus be for use in simultaneously deploying multiple spoolable media within a bore while the through-bore spool apparatus moves along or traverses the bore. In this respect, the provision of the first and second spools on the same or common apparatus may facilitate the simultaneous deployment, and indeed a far more efficient or improved deployment of multiple spoolable media in a bore.

In some example uses, a portion, such as an end portion, of each of the first and second spoolable media may be secured or fixed, for example adjacent an entrance to the bore, at a surface location etc., such that the spoolable media may become despooled from the respective first and second spools as the through-bore spool apparatus traverses the bore.

The through-bore spool apparatus may be configured to traverse the bore by being suitably dimensioned to permit passage along said bore. The through-bore spool apparatus may be configured to traverse the bore by action of gravity, by pumping, by tractoring and/or the like.

The through-bore spool apparatus may be configured to traverse a wellbore. In this respect the through-bore spool apparatus may be defined as a downhole through-bore spool apparatus. The through-bore spool apparatus may be configured to traverse equipment or infrastructure located within a wellbore.

In some examples the bore may be defined within a pipe or pipeline, such as a surface pipeline, subsea pipeline, subsurface pipeline and/or the like.

The first and second spoolable media may be de-spoolable simultaneously from a common side of the through-bore spool apparatus. In use, the first and second spoolable media may extend from a trailing side (i.e., relative to the direction of travel) of the through-bore spool apparatus. The first and second spoolable media may extend from a common or different outlets of the through-bore spool apparatus.

In use, one or both of the first and second spoolable media may extend from the respective first and second spools substantially in the direction of the respective spool axes. One or both of the first and second spoolable media may be substantially aligned, once despooled, with a respective one of the first and second spool axes. In such an arrangement, one or both of the first and second spoolable media may be despooled from an end region of its respective spool.

In use, one or both of the first and second spool axes may be aligned substantially parallel with an axis of the bore in which the through-bore spool apparatus is deployed. Such parallel alignment may contribute to minimising the outer dimension (e.g., diameter) of the through-bore spool apparatus, which may provide advantages when in use in bores of smaller dimensions (e.g., diameters). In one example, both the first and second spool axes may be aligned substantially parallel with an axis of the bore in which the through-bore spool apparatus is deployed.

In some examples, one or both of the first and second spool axes may be non-parallel with an axis of the bore in which the through-bore spool apparatus is deployed.

The first and second spools may be arranged such that the first and second spool axes are substantially parallel with each other. In this example the first and second spool axes may also be substantially parallel with an axis of a bore in which the through-bore spool apparatus is deployed.

In some examples the first and second spools may be arranged such that the first and second spool axes are laterally off-set. In some examples, the first and second spools may be arranged at least partially side-by-side.

The second spool may be arranged on one axial side of the first spool. This arrangement may assist to minimise the outer dimension (e.g., diameter) of the apparatus, which may permit increased utilisation of the apparatus within smaller bore dimensions (e.g., diameters).

The first and second spools may be arranged such that the first and second spool axes are coaxially aligned.

The first and second spools may axially overlap. In examples where the first and second spool axes are coaxially aligned, at least a portion of one of the first and second spools may be received axially within at least a portion of the other of the first and second spools. That is, the first and second spools may be at least partially axially nested together. In examples where the first and second spool axes are laterally offset, an axial overlap may be such that the first and second spools may be arranged, at least partially, side-by-side.

In some examples, the second spoolable medium may extend axially through the first spool. Thus, the second spoolable medium may axially extend or pass through the first spool during despooling of the second spoolable medium from the second spool. Such an arrangement may permit the second spoolable medium to extend from one side of the first spool to the other. This arrangement may provide a more compact and simpler design, avoiding the requirement to route the second spoolable medium around the outer side of the first spool, although in some examples such outside routing may be utilised. Furthermore, this arrangement may assist to maintain a smaller outer dimension (e.g., diameter) of the through-bore spool apparatus. Further, such an arrangement may permit both the first and second spoolable media to extend from a common side of the through-bore spool apparatus, for example as a media bundle. In this example the second spoolable medium may be substantially aligned with or extend along the first spool axis. Such an arrangement may be permitted at least in examples where the first and second spool axes are substantially coaxially arranged.

The passage of the second spoolable medium axially through the first spool may permit the first spoolable medium to become spiraled around the second spoolable medium as the first spoolable medium is despooled.

The first spool may define an axial passage to accommodate the second spoolable medium to pass therethrough. In some examples the axial passage may circumscribe the first spool axis. In some examples at least a portion of the axial passage may be generally cylindrical. In some examples the axial passage may comprise an entry region to receive the second spoolable medium into the first axial passage. The entry region may function to guide the second spoolable medium to a desired orientation or path, for example to become substantially aligned with the first spool axis. In some examples the entry region may accommodate an envelope of movement of the second spoolable medium during despooling from the second spool. The entry region may be tarped, for example conical. The entry region may be generally funnel shaped. In this respect the entry region may comprise a conical section which transitions to a substantially cylindrical section.

In some examples the first and second spools may be similarly constructed. Alternatively, the first and second spools may be differently constructed.

The through-bore spool apparatus may comprise a third spool comprising a third spool axis and a third spoolable medium wound around the third spool axis. In some examples the third spool may be configured similarly to at least one of the first and second spools.

The third spool axis may be arranged to be substantially parallel with at least one of the first and second spool axes.

The third spool axis may be arranged to be laterally off-set form at least one of the first and second spool axes.

The third spool may be arranged on one axial side of the second spool. The second and third spools may be arranged such that the second and third spool axes are coaxially aligned.

In some examples, the third spoolable medium may extend axially through the second spool.

In one example the first, second and third spools may be axially arranged, for example with the second spool axially interposed between the first and third spools. In this example the third spoolable medium may extend axially through the second spool, and the second and third spoolable media may extend axially through the first spool. Such an arrangement may permit the first, second and third spoolable media to extend from a common side of the through-bore spool apparatus, for example as a media bundle.

The through-bore spool apparatus may comprise further spools with further spoolable media, arranged similarly as described above.

In some examples the first and second spoolable media may form or define a media bundle which extends from the through-bore spool apparatus, for example from a common outlet of the through-bore spool apparatus. The provision of a media bundle may exhibit improved strength and/or durability relative to an individual spoolable medium, thus providing advantages during and/or subsequent to deployment in the bore.

The media bundle may be formed following despooling of the first and second spoolable media from the respective first and second spools and prior to exit of the first and second spoolable media from the through-bore spool apparatus. The media bundle may be provided by the first and second spoolable media being arranged in close proximity to each other. The media bundle may be provided by the first and second spoolable media being in intimate contact. The media bundle may be formed by adhesion of the first and second spoolable media together. The media bundle may be provided by an intertwining of the first and second spoolable media. Such intertwining may be achieved by one of the first and second spoolable media being spiraled or twisted around the other of the first and second spoolable media. Such spiraling or twisting may be achieved by the nature of despooling of at least one of the first and second spoolable media.

The through-bore spool apparatus may comprise an outlet, wherein at least one of the first and second spoolable media extends from the outlet. The outlet may define an exit passage to accommodate the passage of at least one of the first and second spoolable media therethrough. In some examples at least a portion of the exit passage may be generally cylindrical. In some examples the exit passage may comprise an access region to receive at least one of the first and second spoolable media into the exit passage. The access region may guide at least one of the first and second spoolable media into a desired position for exiting the through-bore spool apparatus. The access region may be tapered, for example conical. The access region may be generally funnel shaped. In this respect the exit passage may comprise a conical section which transitions to a substantially cylindrical section.

In some examples the exit passage may contain a material which coats at least one of the first and second spoolable media during exiting from the through-bore spool apparatus. Such a coating may be a protective coating, adhesive coating, lubricating coating and/or the like. In some examples the coating may comprise a liquid, gel, highly viscous material, shear thinning fluid, shear thickening fluid, grease and/or the like.

The outlet may comprise an arrangement to resist passage of at least one of the first and second spoolable media therethrough. Such an arrangement may assist to provide a degree of control of movement of the through-bore spool apparatus through a bore. In some examples such an arrangement may apply a degree of tension in at least one of the first and second spoolable media, which may be desirable in some applications.

The through-bore spool apparatus may comprise a single outlet, wherein the first and second spoolable media extend from the single outlet, for example as a media bundle.

The through-bore spool apparatus may comprise multiple outlets, wherein the first and second spoolable media extend from respective outlets.

The first and second spoolable media may comprise any suitable spoolable media which may be desirable to be deployed into the bore. The first and second spoolable media may be selected to provide a desired function during and/or subsequent to deployment. In some examples the first and second spoolable media may provide or facilitate the same function. In some examples the first and second spoolable media may provide or facilitate different functions. Such different functions may be entirely discrete (for example, not associated with each other). However, in other examples, such different functions may be complimentary, and contribute to the performance of a wider operation (e.g., each spoolable medium may be used to facilitate different parts or stages of a common operation).

At least one of the first and second spoolable media may be used during and/or subsequent to being deployed within the bore to facilitate communication applications, such as the transmission of signals (e.g., control signals, data etc.). At least one of the first and second spoolable media may be used during and/or subsequent to being deployed within the bore to facilitate sensing applications, such as distributed sensing applications, including one or more of distributed temperature sensing (DTS), distributed pressure sensing (DPS) and distributed acoustic sensing (DAS). In some examples at least one of the first and second spoolable media may be used during and/or subsequent to being deployed within the bore to provide a mechanical function, for example to provide mechanical strength to (e.g., reinforce) a different spoolable medium, to carry tensile loading, to facilitate a mechanical actuation event and/or the like.

The first and second spoolable media may be similar or identical.

The first and second spoolable media may comprise the same kind or species of medium, with different characteristics or properties, such as dimensions, composition, construction, conductivity, mechanical strength, optical properties, and/or the like.

The first and second spoolable media may comprise different kinds or species of medium.

At least one of the first and second spoolable media may comprise an optical fibre. Such an optical fibre may be used during and/or subsequent to deployment to facilitate communication applications, sensing applications (e.g., distributed sensing) and/or the like. At least one of the first and second spoolable media may comprise a single mode optical fibre. At least one of the first and second spoolable media may comprise a multi-mode optical fibre.

In some examples both the first and second spoolable media may comprise the same type of optical fibre, for example having the same properties such as dimensions, form, construction, optical properties etc. Alternatively, the first and second spoolable media may comprise different types of optical fibre, for example having different properties such as dimensions, form, construction, optical properties etc. In some examples the first spoolable medium may comprise a single mode optical fibre, and the second spoolable medium may comprise a multi-mode optical fibre.

At least one of the first and second spoolable media may comprise an electrical conductor, such as a metal or metal alloy, for example copper.

At least one of the first and second spoolable media may comprise a strength member. The strength member may be configured to accommodate a desired tensile loading. The strength member may be configured to provide reinforcement, such as strength reinforcement, wear reinforcement and the like to another spoolable medium. In some examples at least one of the first and second spoolable media may comprise steel, Kevlar, a plastic or other polymer, composite material and/or the like.

In some examples one or both of the first and second spoolable media may be completely or partially despooled from their respective spools.

The first and second spoolable media may be distinct from each other. That is, the first and second spoolable media may be defined by separate lengths of media, rather than, for example, a single common length. In this respect the spoolable media may not be connected to each other, at least not within the spool apparatus.

In other examples the first and second spoolable media may be defined by a continuous spoolable medium. In such an example a first length of the continuous spoolable medium may be wound on the first spool, and a second length of the continuous spoolable medium may be wound on the second spool. In this case the first length of the continuous spoolable medium may define the first spoolable medium, and the second length of continuous spoolable medium may define the second spoolable medium. In one example despooling of the continuous spoolable medium may be initiated simultaneously from its opposing ends. Such an arrangement may provide advantages in some applications. For example, some applications, such as communication applications, sensing applications and the like using the deployed spoolable medium, may benefit from having more convenient access (such as surface access) to the opposing ends of the continuous spoolable medium. Furthermore, in some cases effectively having dual deployed strands (e.g., a loop) of the same spoolable medium may provide advantages in sensing sensitivity, resolution benefits and the like.

In some distributed sensing operations providing access to opposite ends of a continuous fibre which is effectively arranged in a "loop" during/after deployment can provide advantages, such as allowing double ended distributed sensing operations, which may permit improved sensing capabilities, improved sensitivities, resolution and the like.

The present disclosure may provide advantages in providing the ability to deploy a "looped" fibre (or other media), without necessarily utilising multi-core fibres or fibre bundles, which can be more expensive.

In some examples the continuous spoolable medium may be completely despooled from the first and second spools. Alternatively, the continuous spoolable medium may be partially despooled.

In some examples the first and second lengths of continuous spoolable medium may be integrally formed. Alternatively, the first and second lengths of continuous spoolable medium may be separately formed and connected together, for example by splicing.

The apparatus may accommodate routing of an interconnected length of spoolable medium which extends, integrally or otherwise, between the first and second spools. Such routing may be provided in a manner to prevent adverse interference with the first and second lengths of spoolable media during despoiling. Routing of the interconnected length of spoolable medium may be accommodated via suitable guide channels, recesses, conduits and/or the like. In some examples such routing may comprise internally routing the interconnected length of spoolable medium within the apparatus. Alternatively, at least a portion of the interconnected length of spoolable medium may extend externally of the apparatus. In such an example protection to the interconnected length of spoolable medium which extends externally may be provided, for example in the form of a conduit, shielding etc.

The through-bore spool apparatus may comprise at least one component coupled to at least one of the first and second spoolable media. The at least one component may comprise a temperature sensor, pressure sensor, signal transmitter, signal receiver, light source, light receiver, controller and/or the like.

At least one of the first and second spools may accommodate at least one component coupled to at least one of the first and second spoolable media. For example, at least one of the first and second spools may comprise a pocket or equivalent structure or space to accommodate at least one component.

At least a portion of one or both of the spoolable media may comprise or be provided with a coating. The coating may in some examples be considered an additional coating. That is to say that the coating may be provided in addition to any plastic coating, insulation or the like, that may be provided with commercially available bare spoolable media, such as optical fibre. In that regard, the coating may be considered to be a functional coating, e.g. an additional functional coating for use when winding and/or deploying in a bore, or the like.

The coating may be specifically provided in order to assist retaining one or both of the first and second spoolable media within or on the associated spool. The coating may assist with providing a degree of resistance to discharge from the through-bore spool apparatus. The coating may provide a degree of protection to at least one of the first and second spoolable media, before, during and/or after discharge from the associated spool. The coating may comprise a solid coating, such as a plastic, braided material, Kevlar, PTFE or the like. In some examples the coating may comprise a fluidic material, such as a viscous material. The coating may comprise a grease, or other similar non-Newtonian fluid, such as a shear thickening fluid, shear thinning fluid or the like. The coating may be considered to be functionally adhesive. The coating may exhibit an NGLI number of between 000 to 6, for example between 0 and 5, such as between 2 and 4, for example 3. In some examples multiple different types of coating may be provided, for example along different axial length portions of at least one of the first and second spoolable media.

At least one of the first and second spoolable media may be coated with a coating, such as a grease coating, by stripping at least one of the first and second spoolable media through a store or bath of the coating during discharge. Such a store or bath may be associated with an outlet of the through-bore spool apparatus.

At least one of the first and second spoolable media may be coated with a coating prior to being wound on the associated spool. At least one of the first and second spoolable media may be coated with a coating during the process of winding on the associated spool. For example, the coating may be spray deposited on at least one of the first and second spoolable media during winding.

In one example at least one of the first and second spools may be coated with the coating, such as a grease, prior to winding one of the first and second spoolable media on the spool. As such, winding the medium on the spool may cause said medium to become coated.

At least one of the first and second spools may comprise a discharge region to improve discharge of the associated spoolable medium from the spool. The discharge region may be provided on one end of the spool, for example adjacent a winding surface of the spool. The discharge region may be provided for uses where the spoolable medium is discharged generally parallel with the associated spool axis. The discharge region may assist to lift the spoolable medium from a surface of the spool, such as a winding surface of the spool. This may minimise the effect of a helix of the spoolable medium during discharge from radially binding on the spool, which may otherwise provide resistance to discharge, increasing the likelihood of breakage. Furthermore, in some examples where a degree of adhesion may be present between the spoolable medium and the spool, for example caused by the presence of grease, the discharge region may assist to break this adhesion.

The discharge region may comprise a geometrical feature, such as an upset portion, annular lip, bump or the like.

At least one of the first and second spools may comprise a store region for storing a length of associated spoolable medium, for example separately from a primary wound section of said spoolable medium (for example separately from wrap segments of the spoolable medium, as described below). Such an arrangement may facilitate ease of access to the stored length of the spoolable medium.

The store region may facilitate storage of one end region of the associated spoolable medium. The store region may accommodate at least one wrap or turn of the end region of the associated spoolable medium. In one example the store region may accommodate one end region of the associated spoolable medium, before said medium transitions into forming the primary wound section of said spoolable medium (for example wrap segments). In this example the stored end may define an initiating end of the spoolable medium. In some examples providing ease of access to the initiating end region of the spoolable medium, with the terminating end being easily accessible following winding of the spool, may facilitate testing of the spoolable medium while on the spool, for example permitting transmission of a signal (e.g., optical signal, EM signal etc.) from one end and reception at the other, to detect any issues such as breakage and the like.

Providing ease of access to an end of the spoolable medium in the store region may permit said end of the medium to be available for connection to apparatus, such as a sensor, signal source etc.

The store region may be provided adjacent a winding surface of the spool, for example a winding surface of a bobbin. A transition path may be provided to allow the spoolable medium to extend from the store region to the winding surface. The transition path may comprise a channel, recess, bore or the like.

The store region may comprise an annular recess.

At least one of the first and second spools may comprise a bobbin upon which the associated spoolable media is wound. The bobbin may define an axis. The bobbin axis may be aligned with the associated spool axis. The bobbin axis may define the associated spool axis.

The bobbin may be temporarily provided as part of the spool, for example provided initially to support the associated spoolable medium during winding thereon. In this respect once the spoolable medium is suitably wound, the bobbin may be extracted or removed. Such an arrangement may permit despooling from an interior region of the associated spool, if required. In this example an outer casing or structure may be provided over the wound spoolable medium. The bobbin may comprise a material or coating, such as a low friction material or coating which may assist removal. At least a portion of the bobbin may define a variable geometry to facilitate removal. At least a portion of the bobbin may be frangible, meltable or the like.

The bobbin may provide a permanent component of the spool. For example, the bobbin may remain in place such that the associated spoolable medium is despooled from the bobbin.

The bobbin may comprise or define any cross-section. An outer surface of at least part of the bobbin may be curved, for example circular. An outer surface of at least part of the bobbin may be polygonal, regular or irregular. In such an arrangement an outer surface of at least a portion of the bobbin may comprise or define a flat surface.

The bobbin may define a winding surface, upon which winding surface the associated spoolable medium is wound. At least a portion of the winding surface may be parallel with the bobbin axis. In some examples this may be provided by the bobbin comprising a cylindrical portion. The entire winding surface of the bobbin may be parallel with the bobbin axis. Alternatively, only a portion of the winding surface may be parallel with the bobbin axis.

At least a portion of the winding surface may be tapered relative to the bobbin axis. The taper may be linear. The taper may be curved. The taper may be defined by a conical surface of the bobbin. In some examples the entire winding surface may be tapered. Alternatively, only a portion of the winding surface may be tapered.

The bobbin may comprise a pocket for accommodating at least one apparatus or component. The at least one apparatus or component may comprise a temperature sensor, pressure sensor, signal transmitter, signal receiver, light source, controller and/or the like. The pocket may be provided in an outer surface of the bobbin. The pocket may be provided in an end region of the bobbin, for example aligned on the bobbin axis.

In some examples both the first and second spools may comprise a bobbin upon which the associated spoolable media is wound. Each of the first and second spools may comprise a separate and respective bobbin. In one example the separate bobbins may be mounted separately within the apparatus. Alternatively, the separate bobbins may be connected and/or mounted together.

In some examples a single bobbin may be provided which accommodates both the first and second spoolable media. The single bobbin may be integrally/unitary formed, or formed in different components and connected or secured together. The single bobbin may define separate winding regions to accommodate discrete winding of the first and second spoolable media thereon. The separate winding regions may be arranged axially along a length of the single bobbin.

In some examples providing a single bobbin which accommodates both the first and second spoolable media may permit more convenient ability to interconnect the first and second spoolable media (e.g., to permit "looped" deployment). Such interconnection may comprise a physical connection or may be provided by integrally forming the first and second spoolable media.

The through-bore spool apparatus may comprise a housing, wherein at least one of the first and second spools is mounted within the housing. The housing may provide a degree of protection to at least one of the first and second spools and associated spoolable media. The housing may define or include an outlet to permit at least one of the first and second spoolable media to exit the housing.

The housing may be generally cylindrical. The housing may be generally elongate. The housing may define the outer dimensions of the through-bore spool apparatus.

The housing may comprise a unitary housing component. Alternatively, the housing may comprise multiple components coupled together to form the housing. In some examples, individual housing components may be coupled together via at least one of the first and second spools.

In some examples the housing may comprise at least one housing sleeve. An end of the at least one housing sleeve may be received over a portion of at least one of the first and second spools.

The housing may be closed at one end, for examples a trailing end, by an outlet cap, which outlet cap provides an outlet for at least one of the first and second spoolable media.

The housing may be closed at an opposite end, for example a leading end. The opposite end may be closed by a nose cone, for example.

In one example both the first and second spools are mounted within the housing.

Alternatively, the through-bore spool apparatus may comprise multiple housings, wherein the first and second spools are mounted in respective housings. In this example, individual housings may be secured together. Such individual housings may be arranged side-by-side. Alternatively, such individual housings may be arranged axially relative to each other.

The through-bore spool apparatus may comprise a ballast arrangement, for example contained within a housing of the apparatus. The ballast arrangement may comprise a weighted material to provide the apparatus with a desired weight, for example to accommodate gravity deployment through a bore.

The through-bore spool apparatus may define a fish neck, for example to permit connection with a retrieval tool or the like.

At least one (and in some examples both) of the first and second spoolable media may be wound on a respective spool to form a plurality of wrap segments arranged axially along the respective spool axis, wherein adjacent wrap segments partially overlap in the axial direction. Each wrap segment may comprise a first wrap layer wound in a first axial direction over a first axial distance, and a second wrap layer wound over the first wrap layer in a reverse second axial direction over a second axial distance greater than the first axial distance. When arranged as such, the spoolable medium may extend from the second wrap layer of one wrap segment to the first wrap layer of an adjacent wrap segment.

Accordingly, at least one of the first and second spools may comprise an axial array of partially overlapping wrap segments each extending along only a portion of the axial length of the associated spool. In this respect, the total axial length of the spool may be dictated by the number of wrap segments arranged along the spool axis and the degree of overlap provided between each adjacent segment.

The first wrap layer of one wrap segment may extend in the first axial direction and over the second wrap layer of a preceding wrap segment.

During despooling, the wrap layers of one segment may be unwound before being unwound from an adjacent wrap segment, and so on. In this way, during despooling the wrap segments may each be sequentially depleted, one after the other, in an axial direction, which may be referenced as the depleting direction, along the associated spool axis. In this respect, during despooling, the axial length of the spool will reduce in the depleting direction. This contrasts with conventional spool arrangements in which despooling does not affect the axial spool length (at least until the final layer is reached), with the diameter instead reducing as individual layers are depleted.

The axial fleeting movement or traverse made by a launch or release point of the spoolable medium during despooling from an individual wrap layer is limited to the axial length of each individual wrap segment, and not, as conventionally known, the entire axial length of the spool, which may otherwise cause complications, such as from the unwound section of spoolable medium effectively dragging across and possibly disturbing the windings still on the associated spool.

Furthermore, the provision of partially overlapping wrap segments may be such that at least a proportion of one wrap segment is supported or constrained by the overlapping adjacent segment. Where more than two wrap segments are provided, an intermediate wrap segment may partially overlap an adjacent wrap segment located on one axial side, and be partially overlapped by an adjacent wrap segment on the opposite axial side. In this way the intermediate wrap segment may firstly provide circumferential support to the underlying portion of the adjacent wrap segment on one side, while being supported by the overlying portion of the adjacent wrap segment on the opposite side. Where the axial overlap is such that there may be axial overlap of one wrap segment with multiple adjacent wrap segments, the supporting effect may be enhanced.

When multiple, for example more than 3, more than 5, more than 10, more than 15, more than 30, more than 50, more than 100, more than 150 etc., wrap segments are provided, the supporting effect by the multiple overlapping adjacent wrap segments may be such as to provide a robust spool which is resistant to portions becoming prematurely unraveled, or the like. Further, the multiple adjacent and overlapping segments may provide a degree of resistance to being disturbed by any object, such as the despooled portion of the spoolable medium, dragging thereacross. Also, the supporting effect of the overlapping segments may be such that any requirement for spool end flanges may be minimised or eliminated.

In some examples a spoolable medium may, in use, be deployed from its associated spool to extend in a direction generally parallel to the associated spool axis. The winding arrangement of the spool may provide benefits in this regard, for example by better accommodating any dragging of the despooled spoolable medium across the spool, or minimising the length of the spool which may be subject to interference by the despooled portion. In some examples the deployed spoolable medium may extend generally parallel and laterally offset from the spool axis. In some examples the deployed spoolable medium may extend generally coaxial with the spool axis.

In some examples the spoolable medium may, in use, be despooled and deployed in the depletion direction of the wrap segments. Alternatively, the spoolable medium may, in use, be despooled and deployed in the direction opposite to the depletion direction of the wrap segments. In this example any dragging of the despooled portion across the remaining wraps may be minimised.

The direction in which the spoolable medium is deployed, for example axially deployed, from the associated spool may be in accordance with user preference, operational requirements and the like. In some examples a preferred direction of deployment may be determined by the axial length of the spool. For example, for relatively long spools, there may be a preference to deploy the spoolable medium in a direction opposite to the depletion direction of the wrap segments. In this way the deployed spoolable medium may only ever pass or drag across a single wrap segment, i.e., the immediate segment form which the spoolable medium is being deployed. In examples where a shorter spool is provided, it may be more acceptable to deploy the spoolable medium in the depletion direction of the wrap segments. While the deployed spoolable medium might drag across the multiple wrap segments, the nature and robustness of the winding arrangement may be such that this is acceptable.

One or more, for example each, wrap segment may comprise one or more wrap layers in addition to the first and second wrap layers. However, in some examples one or more, for example each, wrap segment may comprise only the first and second wrap layers.

As noted above the second wrap layer may extend over the second axial distance which is greater than the first axial distance of the first wrap layer. The additional axial distance covered by the second wrap layer in each wrap segment may facilitate or provide a desired axial spacing of the adjacent wrap segment. In some examples the portion of the second wrap layer which extends axially beyond the first wrap layer may function to provide support, for example axial support, to the first wrap layer. This may restrict or minimise axial slippage or otherwise of the first wrap layer. In some examples the portion of the second wrap layer which extends axially beyond the first wrap layer may be referred to or define an anchor portion or anchor winding portion.

The wrap segments, and indeed each of the wrap layers, may include individual wraps or turns of spoolable medium which are wrapped at a winding pitch. In this respect the winding pitch may be defined as the angle of an individual wrap with reference to the associated spool axis. A steep winding pitch may define a larger angle relative to the spool axis, whereas a shallow winding pitch may define a smaller angle relative to the spool axis. A steeper winding pitch may provide more individual turns or wraps of the spoolable medium per unit axial spool length, whereas a shallower winding pitch may provide a lower number of individual turns or wraps per unit axial spool length. A winding pitch which provides adjacent spoolable medium turns or wraps in engagement with each other may be defined as a closed winding pitch. Adjacent spoolable medium turns or wraps which are axially separated may define an open winding pitch.

In some examples a transition of the spoolable medium from the first wrap layer to the second wrap layer in one or more, for example each, wrap segment may be provided with a substantially constant winding pitch, albeit with a winding direction change.

A transition of the spoolable medium from the first wrap layer to the second wrap layer in one or more, for example each, wrap segment may be provided with a change in winding pitch. In one example the winding pitch may become shallower once transitioned into the second wrap layer. Such an arrangement may provide the second wrap layer with fewer turns or wraps of the spoolable medium.

During despooling, this may cause the second wrap layer to be depleted faster than the first wrap layer, at least with the same rate of spoolable medium deployment. This may provide benefits where the second wrap layer exhibits a reduced self-support capability of individual turns or wraps, in that residence time of depleting from the second wrap layer is minimised.

In some examples the transition of the spoolable medium from the first wrap layer into the second wrap layer may be provided with a significant change, for example reduction, in winding pitch. The transition of the spoolable medium from the first wrap layer into the second wrap layer may be provided with a change from a closed winding pitch to an open winding pitch.

In one example the first wrap layer of one or more, for example each, wrap segment may comprise a varying winding pitch. For example, the winding pitch may vary in an axial direction. The first wrap layer of one or more, for example each, wrap segment may comprise a uniform winding pitch. For example, the winding pitch may remain constant throughout the first wrap layer. In some examples the first wrap layer may comprise a closed winding pitch. This may facilitate maximising the length of spoolable medium which is contained within the first wrap layer.

In one example the second wrap layer of one or more, for example each, wrap segment may comprise a uniform winding pitch. For example, the winding pitch may remain constant throughout the second wrap layer.

The second wrap layer of one or more, for example each, wrap segment may comprise a varying winding pitch. For example, the winding pitch may vary in an axial direction.

In one example a first axial portion of the second wrap layer of one or more, for example each, wrap segment may comprise a first winding pitch and a second axial portion of the second wrap layer may comprise a second winding pitch. The first winding pitch may be shallower than the second winding pitch. A transition between the first and second axial portions of the second layers may be defined by a change in winding pitch. In one example the second winding pitch may be a closed winding pitch.

In one example the first axial portion may extend over the axial extent of the underlying first wrap layer, and the second axial portion may extend over the additional axial distance covered by the second wrap layer. In this respect the second axial portion may define an anchor portion or anchor winding portion. The second axial portion may extend over an outer surface of a bobbin.

At least two of the plurality of wrap segments may define a common outer maximum diameter.

The overlapping nature of adjacent wrap segments may result in at least a portion of one or more of the wrap segments defining or comprising a tapered region relative to the spool axis. Such a tapered region may provide advantages in permitting one wrap or turn of spoolable medium within a wrap layer providing support or defining an anchor point for an adjacent turn or wrap. This effect may be most prominent in a wrap of a tighter winding of the tapered region providing support to an adjacent wrap of a larger radius winding (i.e., on the upslope side).

In one example the first axial direction of winding of the first layer of each segment may be in an upslope direction of a taper. In this way, as individual wraps or turns of the first layer are wound, every tighter wound wrap or turn may provide an anchor for the subsequent turn or winding on the upslope side. This may not only provide benefits once the spool is completely formed, but also during the winding process of the spoolable medium onto the spool.

At least one of the first and second spools may comprise a bobbin including a winding surface. The winding surface may be tapered, wherein the taper of the winding surface may permit at least portions of one or more of the wrap segments to define a taper, which may provide advantages, such as those mentioned above.

One portion of the winding surface of the bobbin may be tapered relative to a bobbin axis, and an adjacent portion of the winding surface may be parallel relative to the bobbin axis. Winding of the associated spoolable medium on to the bobbin may be initiated on the tapered portion. For example, winding of the first wrap layer of an initial wrap segment may be initiated on the tapered portion. This arrangement may initiate a taper of each wrap segment. Furthermore, this arrangement may facilitate self-support within adjacent wraps or turns of the spoolable medium in the first layer.

In one example, winding of the first wrap layer of an initial wrap segment may be initiated at or adjacent a transition region between the tapered and parallel portions of the winding surface.

The first axial direction may be a direction which is in an up-sloping direction of the tapered portion. This may permit each wrap or turn of spoolable medium in the first wrap layer to support an adjacent wrap or turn on the upslope side.

At least one of the first and second spools may be non-rotatable, such that said at least one spool does not rotate during despooling of the associated spoolable medium. In this case a launch point of the spoolable medium may orbit the spool. Such orbiting motion may permit one of the first and second spoolable media to be wound around the other of the first and second spoolable media during despooling.

At least a portion of one or both of the first and second spools may be rotatable. At least one of the first and second spools may rotate during despooling of the associated spoolable medium therefrom. In one example rotation of the spool may facilitate a launch point of the spoolable medium from the spool at a fixed rotational position. In some examples rotation of the spool may facilitate a launch point of the spoolable medium from the spool that orbits the spool, but at a lessor rate than were the spool to be fixed. In other similar words, rotation of the spool may be used to reduce the speed of orbiting of the launch point, e.g. compared to having a fixed spool. In some examples the spool may be driven by a rotary drive. Alternatively, a torque may be applied to the spool by the action of the associated spoolable medium despooling therefrom. A measurement of rotation of the spool may facilitate the length of spoolable medium despooled being determined.

At least one of the first and second spools may comprise multiple spool portions, wherein the associated spoolable medium may extend between adjacent spool portions.

At least one of the first and second spools may be mounted in cantilever form within the through-bore spool apparatus. In this respect at least one of the first and second spools may define a fixed or proximal end, and a free or distal end.

The through-bore spool apparatus may comprise one or more centralisers to facilitate appropriate positioning of the apparatus within a bore. The one or more centralisers may provide central alignment of the spool apparatus with the bore. Alternatively, the centralisers may provide an eccentric or otherwise off-centre alignment of the spool apparatus with the bore. In this respect, such an off-centre alignment may be advantageous in some circumstances, such as to provide a desired positioning of the first and second spoolable media within the bore following deployment.

Features defined in relation to the through-bore spoolable apparatus are presented above, with various elements of the spool apparatus defined when in use. In this respect, an aspect of the present disclosure also relates to a method for deploying multiple spoolable media in a bore, for example using the through-bore spool apparatus. The features defined in relation to the spool apparatus of any other aspect may thus be considered described in combination with any method for deploying multiple media in a bore. For brevity a full repeat of the features are not presented here.

An aspect of the present disclosure relates to a method for deploying multiple spoolable media within a bore, comprising:
  locating a through-bore spool apparatus within the bore, wherein the through-bore spool apparatus comprises a first spool comprising a first spoolable medium and a second spool comprising a second spoolable medium; and
  moving the through-bore spool apparatus through the bore while simultaneously de-spooling the first and second spoolable media from the respective first and second spools.

The through-bore spool apparatus may be provided in accordance with any other aspect, and as such the features defined in relation to any other aspect are also presented in relation to the method for deploying multiple spoolable media within a bore.

An aspect of the present disclosure relates to a through-bore spool apparatus for use in deploying multiple elongate media in a bore, the spool apparatus comprising:
  a first spool comprising a first spool axis and a first elongate medium wound around the first spool axis;
  a second spool located on one axial side of the first spool and comprising a second spool axis and a second elongate medium wound around the first spool axis;
  wherein the first and second elongate medium are de-spoolable simultaneously from the respective first and second spools and through the outlet of the housing during movement of the spool apparatus along a bore.

An aspect of the present disclosure relates to a spool apparatus, comprising:
  a first bobbin for supporting a first spoolable medium; and
  a second bobbin for supporting a second spoolable medium;
  wherein the through-bore spool apparatus is configured to permit first and second spoolable media to be de-spoolable simultaneously from the respective first and second bobbins during movement of the through-bore spool apparatus along a bore.

An aspect of the present disclosure relates to a through-bore spool apparatus for deploying a loop of a spoolable medium within a bore, the through-bore spool apparatus comprising:
  a first spool comprising a first length of the spoolable medium wound thereon, wherein the first length of the spoolable medium comprises a first end of the spoolable medium; and
  a second spool comprising a second length of the spoolable medium thereon, wherein the second length of the spoolable medium comprises a second end of the spoolable medium;
  wherein the first and second ends of the spoolable medium are de-spoolable simultaneously from their respective first and second spools during movement of the through-bore spool apparatus along a bore.

An aspect of the present disclosure relates to a method for deploying a loop of a spoolable medium within a bore, comprising:
  locating a through-bore spool apparatus within the bore, wherein the through-bore spool apparatus comprises:
    a first spool comprising a first length of the spoolable medium wound thereon, the first length of the spoolable medium comprising a first end of the spoolable medium; and
    a second spool comprising a second length of the spoolable medium thereon, wherein the second length of the spoolable medium comprises a second end of the spoolable medium a second spool comprising a second spoolable medium; and
  moving the through-bore spool apparatus through the bore while simultaneously de-spooling the first and second ends of the spoolable medium from the respective first and second spools.

Features defined in relation to one aspect may be provided in combination with any other aspect.

BRIEF DESCRIPTION OF THE DRAWINGS

These and other aspects of the present disclosure will be described, by way of example only, with reference to the accompanying drawings, in which:

FIG. 21 is a diagrammatic illustration of an alternative through-bore spool apparatus in use deploying multiple spoolable media into a bore;

FIG. 22 is a diagrammatic top elevation of the through-bore spool apparatus of FIG. 21;

DETAILED DESCRIPTION OF THE DRAWINGS

Aspects of the present disclosure relate to a through-bore spool apparatus capable of traversing a bore such that multiple spoolable media (and/or a loop of a continuous spoolable medium) may become deployed from the spool apparatus and into the bore. The apparatus may be used in many applications or environments. For the purposes of the present description the apparatus is for use within a wellbore, but it should be recognised that this is merely exemplary. It should be understood that the drawings presented are not provided to scale, and may not reflect actual dimensions, ratios, angles, number of features and the like.

Figure 1:
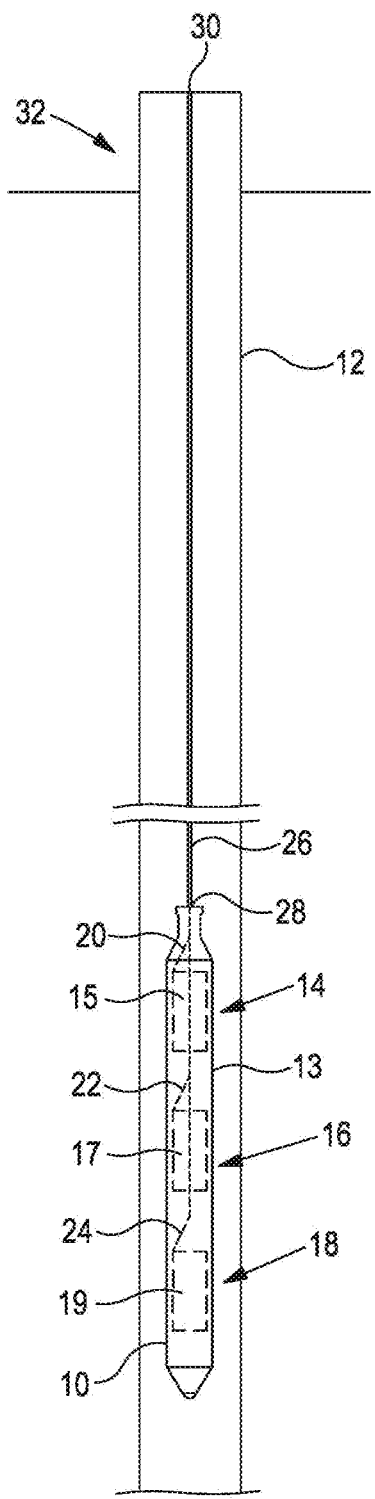
FIG. 1 is a diagrammatic illustration of a through-bore spool apparatus in use deploying a media bundle into a bore.

FIG. 1 is a diagrammatic illustration of a through-bore spool apparatus 10 deployed within a wellbore 12. The apparatus 10 includes an elongate housing 13 which carries first, second and third spools 14, 16, 18 including respective first, second and third bobbins 15, 17, 19 with respective first, second and third spoolable media 20, 22, 24 wound thereon. In the present example the first, second and third spools 14, 16, 18 are coaxially arranged within the housing 13, wherein the third spoolable medium 24, once despooled, is guided to pass axially through the first and second spools 14, 16, and the second spoolable medium 22, once despooled, is guided to pass axially, together with the third spoolable medium 24, through the first spool 14. The first, second and third spoolable media 20, 22, 24 form a media bundle 26 which extends from an outlet 28 located at the trailing end of the apparatus 10. In use, an end 30 of the media bundle 26 is fixed, for example at a surface location 32, such that the media bundle 26, comprising the first, second and third spoolable media 20, 22, 24, becomes deployed within the wellbore 12 as the apparatus 10 traverses the wellbore 12. Such traversing of the apparatus 10 through the wellbore 12 may be provided by gravity, pumping, tractoring and/or the like.

The first, second and third spoolable media 20, 22, 24 may comprise any suitable spoolable media which may be desirable to be deployed into the wellbore 12. The spoolable media 20, 22, 24 may be selected to provide a desired function during and/or subsequent to deployment.

At least one of the spoolable media 20, 22, 24 may be used during and/or subsequent to deployment to facilitate communication applications, such as the transmission of signals (e.g., control signals, data etc.) between the apparatus 10 and surface 32. At least one of the spoolable media 20, 22, 24 may be used during and/or subsequent to deployment to facilitate sensing applications within the wellbore 12, such as distributed sensing applications, including one or more of distributed temperature sensing (DTS), distributed pressure sensing (DPS) and distributed acoustic sensing (DAS). At least one of the spoolable media may be used during and/or subsequent to deployment to provide a mechanical function, for example to provide mechanical strength to (e.g., reinforce) a different spoolable medium, to carry tensile loading, to facilitate a mechanical actuation event and/or the like.

At least one of the spoolable media 20, 22, 24 may comprise an optical fibre. Such an optical fibre may be used during and/or subsequent to deployment to facilitate communication applications, sensing (e.g., distributed sensing) applications and/or the like. At least one of the spoolable media 20, 22, 24 may comprise a single mode optical fibre. At least one of the spoolable media 20, 22, 24 may comprise a multi-mode optical fibre.

At least one of the spoolable media 20, 22, 24 may comprise an electrical conductor.

At least one of the spoolable media 20, 22, 24 may comprise a strength member, for example to accommodate a desired tensile loading, to provide reinforcement, such as strength reinforcement, wear reinforcement and the like to another spoolable medium.

Figure 2:
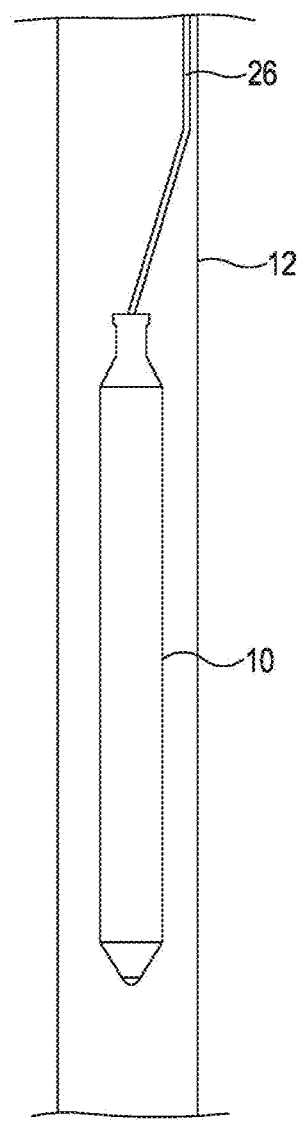
FIG. 2 diagrammatically illustrates the through-bore spool apparatus of FIG. 1, with the deployed media bundle being located against or in proximity to a bore wall.

In the example illustrated in FIG. 1 the media bundle 26 is shown aligned centrally within the wellbore 12. However, in other examples, such as shown in FIG. 2, the media bundle 26 may be positioned adjacent or in contact with the wall of the wellbore 12. Such an arrangement may be preferable in some applications, for example to place the media bundle 26 in a preferred, such as a more protected position within the wellbore 12. In this respect, and although not shown, the apparatus 10 may comprise features or means to encourage or bias the media bundle 26 towards the wall of the wellbore 12. In some examples the media bundle 26 may become secured to the wall of the wellbore 26, for example via magnets, via an adhesive coating on the media bundle 26 and/or the like.

Figure 3:
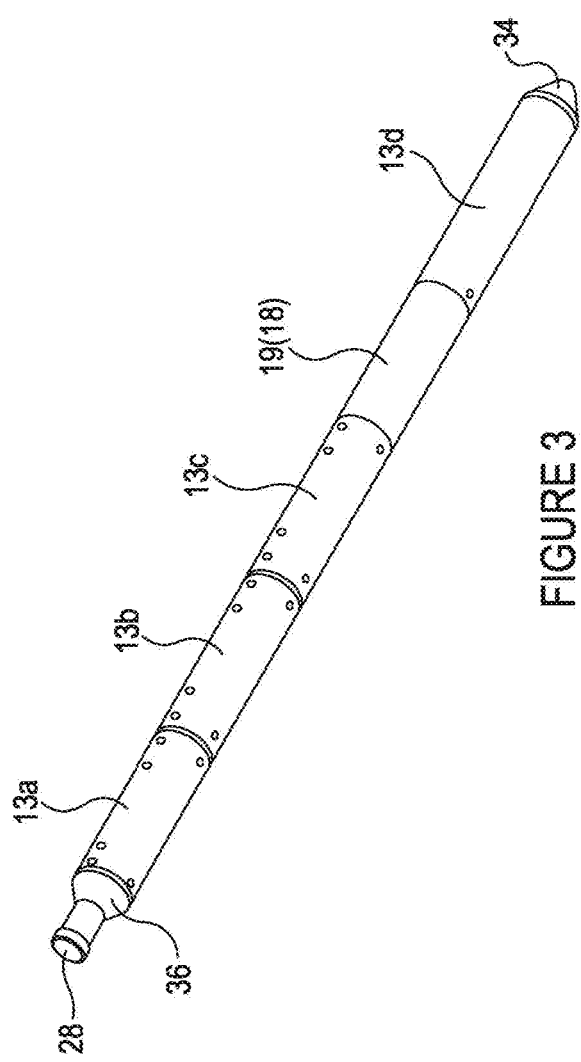
FIG. 3 is a perspective view of an example through-bore spool apparatus.

FIG. 3 provides a perspective view of the through-bore spool apparatus 10 of FIG. 1, and illustrates the housing 13 of the apparatus 10 as including multiple housing components or sleeves, specifically first to fourth housing sleeves 13a-d secured together, wherein a portion of the bobbin 19 of the third spool 18 also defines an extended outer portion of the housing 13, interposed between the third and fourth housing sleeves 13c, 13d. A lower end of the apparatus 10 includes a leading end nose cone 34, and the trailing end includes an outlet cap 36 which includes the media bundle outlet 28.

Figure 4:
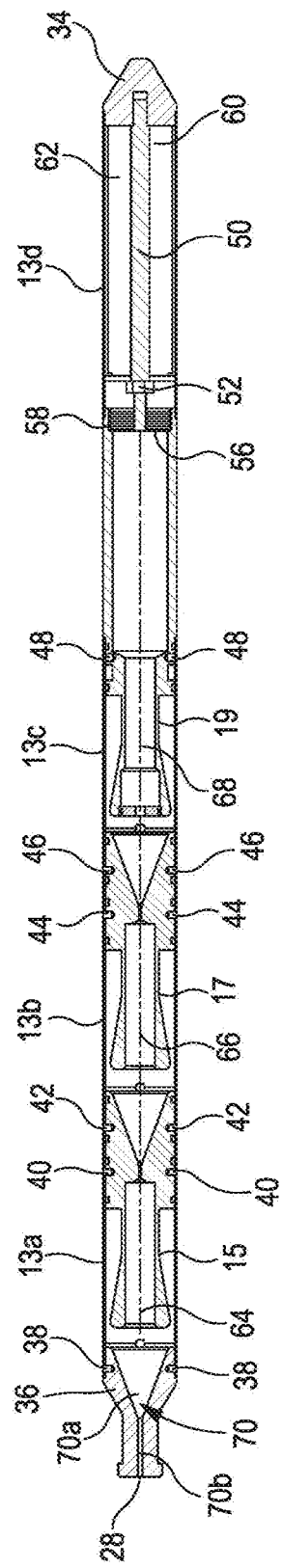
FIG. 4 is a cross-sectional view of the through-bore spool apparatus of FIG. 3.

A longitudinal cross-sectional view through the spool apparatus 10 is illustrated in FIG. 4, reference to which is now made. For clarity purposes the first, second and third bobbins 15, 17, 19 are illustrated without the associated spoolable media wound thereon.

One end of the first housing sleeve 13a is secured to the outlet cap 36 via screws 38, and an opposite end of the first housing sleeve 13a is secured to the first bobbin 15 via screws 40. One end of the second housing sleeve 13b is secured to the first bobbin 15 via screws 42 whereas an opposite end of the second housing sleeve 13b is secured to the second bobbin 17 via screws 44. In a similar manner, one end of the third housing sleeve 13c is secured to the second bobbin 17 via screws 46 whereas an opposite end of the third housing sleeve 13c is secured to the third bobbin 19 via screws 48. In this respect, the first, second and third bobbins 15, 17, 19 facilitate interconnection of the housing sleeves 13a-c, and thus improved modular construction of apparatus 10.

The fourth housing sleeve 13d extends between the third bobbin 19 and the end nose cone 34. In this respect the end nose cone 34 is secured against an end of the fourth housing sleeve 13d via a threaded rod 50 which is tightened, via a nut 52, against a cavity lid 54. An end of the threaded rod 50 includes a threaded inset 56 which is threadedly secured with an internal threaded portion 58 provided in an end of the third bobbin 19.

The fourth housing sleeve 13d, end nose cone 34 and cavity lid 54 collectively define a cavity 60 within the apparatus 10, wherein the cavity 60 contains a ballast material 62 to provide a desired weight of the apparatus 10, for example to facilitate gravity deployment.

Each bobbin 15, 17, 19 defines a respective bobbin or spool axis 64, 66, 68, wherein the bobbins 15, 17, 19 are arranged within the apparatus 10 such that the axes 64, 66, 68 are arranged coaxial with each other, and substantially parallel with an axis of the wellbore 12 (FIG. 1) in which the apparatus 10 is deployed. Such an arrangement may permit the apparatus 10 to accommodate the multiple spools while maintaining a minimum outer diameter of the apparatus 10, which may improve utility of the apparatus 10 in bores of smaller diameters.

The outlet cap 36 defines or includes an exit passage 70 which accommodates the passage of the media bundle 26 (FIG. 1) towards the outlet 28. The exit passage 70 is generally funnel shaped and includes a conical portion 70a which transitions to a cylindrical portion 70b. In this respect the conical portion 70a functions to guide the media bundle into alignment with the cylindrical portion 70b.

In some examples the exit passage 70 may contain a material (not shown) which coats the media bundle during exiting from the apparatus 10. Such a coating may be a protective coating, adhesive coating, lubricating coating and/or the like. In some examples the coating may comprise a liquid, gel, highly viscous material, shear thinning fluid, shear thickening fluid, grease and/or the like.

Figure 5:
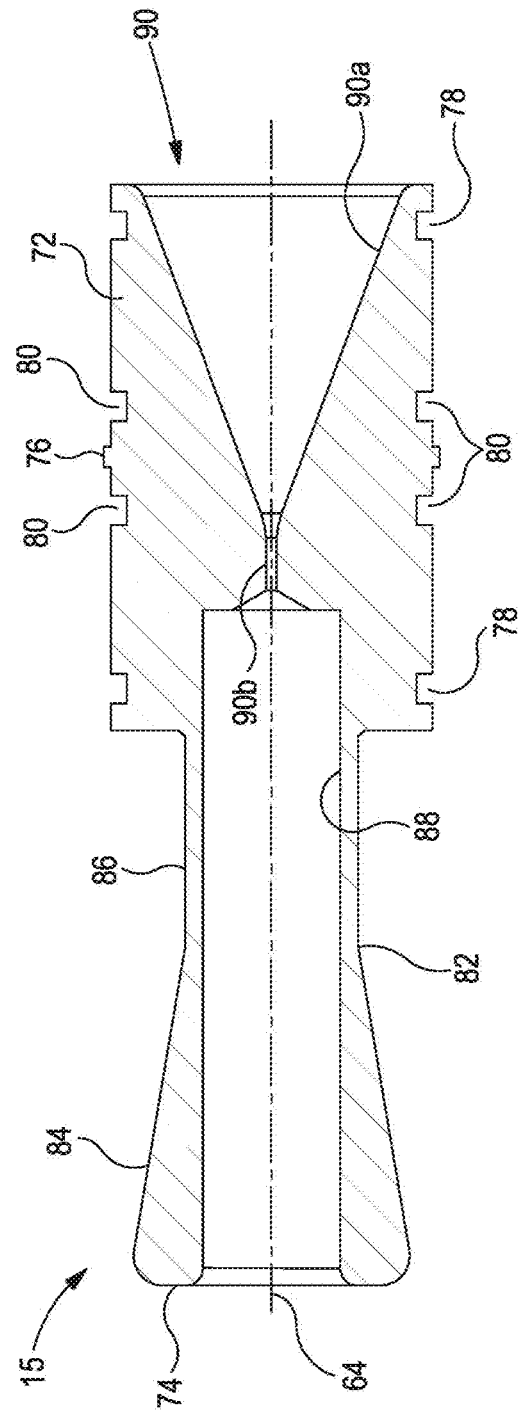
FIGS. 5 and 6 are cross-sectional views of different spool bobbins shown removed from the through-bore spool apparatus of FIG. 3.

FIG. 5 provides a cross-sectional view of the first bobbin 15 removed from the apparatus 10. In the present example the first and second bobbins 15, 17 are identically formed, and as such the present description with reference to FIG. 5 equally applies to the second bobbin 17.

The first bobbin 15 includes a proximal end region 72 and a distal end region 74, wherein the proximal end region 72 is configured to be engaged and connected to the first and second housing sleeves 13a, 13b (see FIG. 4), such that the distal end region 74 extends in cantilever form from the proximal end region 72. The proximal end region 72 includes an annular lip 76 which provides abutment on opposing sides thereof with the first and second housing sleeves 13a, 13b (see FIG. 4). The proximal end region 72 also includes seal grooves 78 for accommodating seals (not shown) for sealing engagement with the respective first and second housing sleeves 13a, 13b, and also a number of screw holes 80 to facilitate screwed connection to the respective first and second housing sleeves 13a, 13b.

The distal end region 74 includes a winding surface 82 which accommodates winding of the first spoolable medium 20 (see FIG. 1) thereon, such that the first spoolable medium 20 is wound around the bobbin/spool axis 64. In the present example the winding surface 82 includes a conical portion 84 and a cylindrical portion 86. An example process for winding a spoolable medium on the winding surface 82 will provided later below.

The first bobbin 15 includes a central passage 88 extending axially therethrough and circumscribing the first spool axis 64, wherein the central passage 88 is configured to accommodate, in this case, axial passage of the second and third spoolable media 22, 24 (see FIG. 1). In the present example the central passage 88 comprises a variable geometry and includes an entry region 90 to receive the second and third spoolable media 22, 24 (FIG. 1) into the central passage 88 such that the second and third spoolable media become aligned with the first spool axis 64. The entry region 90 in the present example is generally funnel shaped, comprising a conical section 90a which transitions to a substantially cylindrical section 90b.

Figure 6:
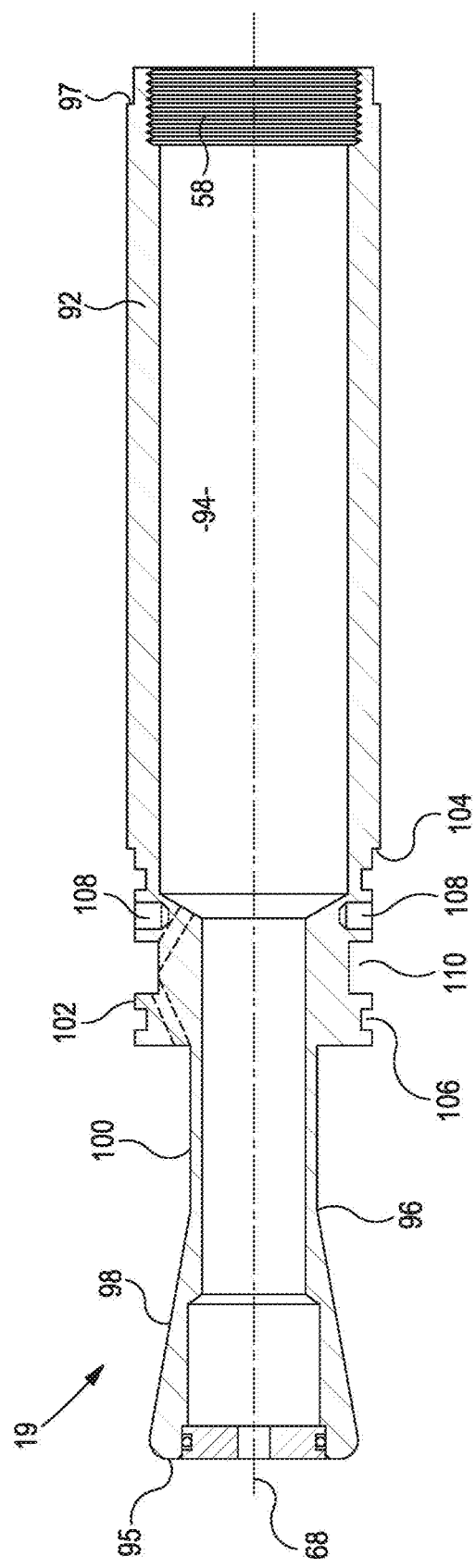

FIG. 6 provides a cross-sectional view of the third bobbin 19 removed from the apparatus 10. The third bobbin 19 includes a cylindrical wall portion 92 at a proximal end thereof, wherein the cylindrical wall portion 92 defines an internal cavity 94 within the third bobbin 19. As will be described in more detail below, the cavity 94 is configured to accommodate one or more components, such as a sensor, transmitter, receiver, controller etc. Such components may be used during and/or following deployment of the apparatus within the wellbore 12 (FIG. 1), for example to perform or support sensing operations, communication operations and the like. An end of the cylindrical wall portion 92 includes the internal threaded portion 58 which, as illustrated in FIG. 4, facilitates threaded connection with the threaded insert 56. The same end of the cylindrical wall portion 92 also includes an axial shoulder 97 which provides abutment with the fourth housing sleeve 13d (see FIG. 4).

The third bobbin 19 comprises a distal end region 95 including a winding surface 96 which accommodates winding of the third spoolable medium 24 (see FIG. 1) thereon, such that the third spoolable medium 24 is wound around the third spool/bobbin axis 68. In a similar manner to the first and second bobbins 15, 17, the winding surface 96 of the third bobbin 19 includes a conical portion 98 and a cylindrical portion 100.

The third bobbin 19 further comprises an intermediate region 102 which is interposed between the cylindrical wall portion 92 and the distal end region 95. The intermediate region 102 is configured to be engaged and connected to the third housing sleeve 13c (see FIG. 4), such that the distal end region 95 extends in cantilever form from the intermediate region 102. The intermediate region 102 includes an axial shoulder 104 which provides abutment with the third housing sleeve 13c (see FIG. 4). The intermediate region 102 also includes a seal groove 106 for accommodating a seal (not shown) for sealing engagement with the third housing sleeve 13c, and also a number of screw holes 108 to facilitate screwed connection to the third housing sleeve 13c.

The intermediate region 102 also includes an annular recess 110 for accommodating an end region of the third spoolable medium 24 (FIG. 1) when wound on the third bobbin 19. A first feed-through bore 112 extends between the recess 110 and the winding surface 96 of the third bobbin 19, and similarly a second feed-through bore 114 extends between the recess 110 and the cavity 94. The first and second feed-through bores 112, 114 may facilitate routing of the third spoolable medium between the cavity 94 (and any components therein) and the winding surface 96. The annular recess 110 may accommodate a number of turns of the third spoolable medium, which may be desirable to provide a degree of slack, for example to accommodate splicing or re-splicing of the third spoolable medium with any component contained within the cavity 94.

A description of a sequence of winding a length of the first spoolable medium 20 on the first bobbin 15 will now be described with reference to FIGS. 7 to 12, which each illustrate the distal end region 74 of the first bobbin 15, showing the conical and cylindrical portions 84, 86 of the winding surface 82, and the bobbin axis 64.

Figure 7:
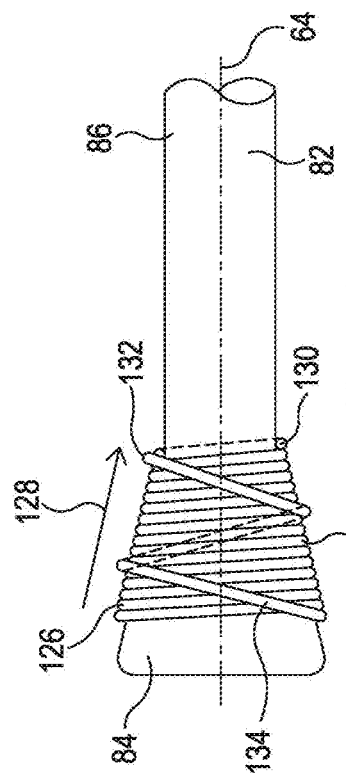
FIGS. 7 to 12 diagrammatically illustrate a sequence of winding a spoolable medium on a bobbin to form a spool for use in the through-bore spool apparatus of FIG. 3.

With initial reference to FIG. 7, winding of the first spoolable medium 20 is initiated at a winding start point 120 at the interface between the conical portion 84 and cylindrical portion 86 of the winding surface 82. The first spoolable medium 20 is then wound in a first axial direction, indicated by arrow 122, relative to the bobbin axis 64 to form a number of adjacent individual turns or wraps, at a steep winding pitch which provides the adjacent wraps in contact with each other (i.e., a closed winding pitch). In the present case the first axial direction is such that the first spoolable medium 20 is added to the bobbin 15 in an upslope direction of the conical portion 84, until reaching point 124, thus defining a first wrap layer 126. By winding in an upslope direction each wrap or turn provides support to the subsequent wound wrap or turn of the first spoolable medium 20.

Figure 9:
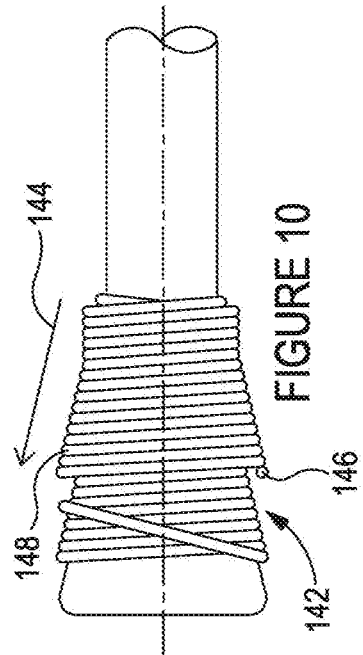
Figure 8:
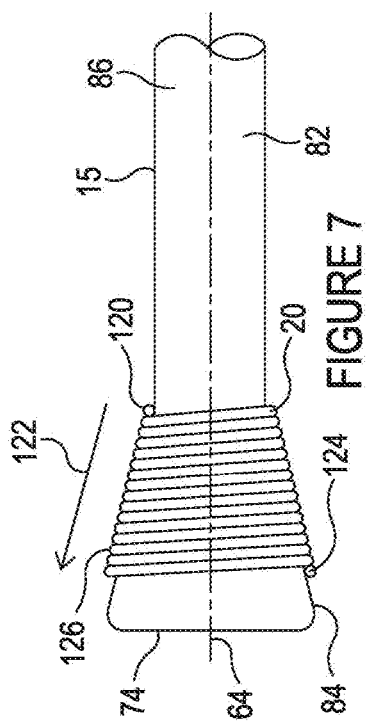

As shown in FIG. 8, the first spoolable medium 20 is then wound in a reverse second axial direction, illustrated by arrow 128, over the first wrap layer 126 at a much shallower winding pitch, until reaching point 130 where the first spoolable medium 20 is on the cylindrical portion 86 of the winding surface 82, adjacent the starting point of the first wrap layer 126. This may form a first portion 132 of a second wrap layer 134. Following this, as shown in FIG. 9, winding of the first spoolable medium 20 is continued further in the second axial direction, illustrated by arrow 136, to form a second portion 138 of the second wrap layer 134, until reaching point 140. The second portion 138 of the second wrap layer 134 is wound at a steeper winding pitch (in this case a closed winding pitch) relative to the first portion 132 of the second wrap layer 134. The second portion 138 may function to provide support to the first wrap layer 126, and as such in some cases the second portion 138 may be defined as an anchor or anchor winding portion. The first and second wrap layers 126, 134 may form a first wrap segment 142.

Figure 11:
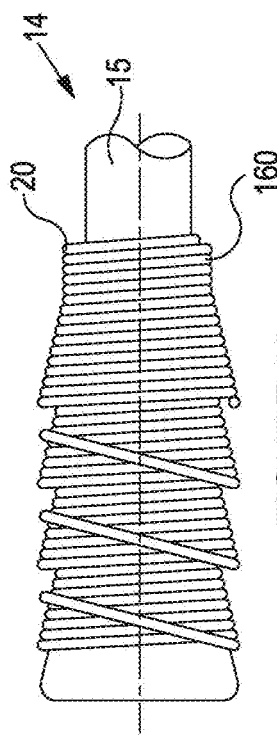
Figure 10:
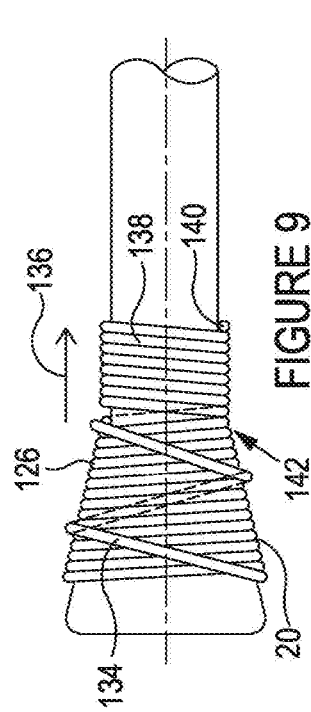

Following this, as illustrated in FIG. 10, the first spoolable medium 20 is wound again in the first direction, illustrated by arrow 144, over the first wrap segment 142, at a closed wind pitch until reaching point 146 to form a subsequent first layer 148. Next, as illustrated in FIG. 11, the first spoolable medium 20 is wound in the direction of arrow 150, at a shallower winding pitch over the first layer 148, with the first spoolable medium 20 continuing to be wound in the direction of arrow 154 to complete a second wrap layer 156. The newly formed first and second wrap layers 148, 156 define a second wrap segment 158 which axially overlaps the first wrap segment 142, wherein each wrap segment extends to a common outer diameter.

Figure 12:
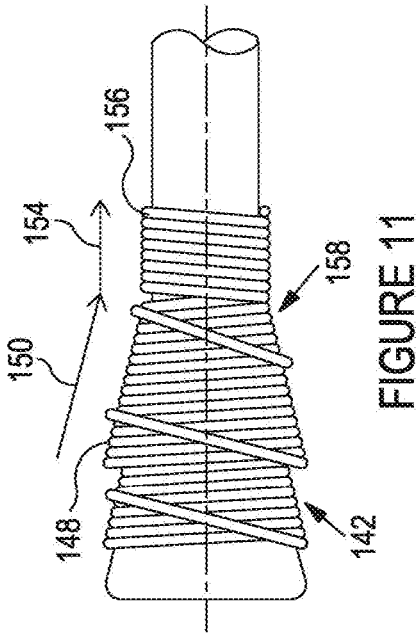

The above winding process may be repeated or continued in the same manner to add further axially overlapping wrap segments, as illustrated in FIG. 12. The winding of the first spoolable medium 20 may be completed by winding a final wrap layer 160, as illustrated in FIG. 12.

The winding process may be continued until the required length of the first spoolable medium 20 has been wound onto the first bobbin 15 to form the complete first spool 14. In some examples between 10 to 10,000 meters, and possibly more, of the first spoolable medium 20 may be wound onto the first bobbin 15, perhaps over 2 to 300, and possibly more, axially overlapping wrap segments.

The provision of partially overlapping wrap segments may be such that at least a proportion of one wrap segment is supported or constrained by the overlapping adjacent segment. Further, the multiple adjacent and overlapping segments may provide a degree of resistance to being disturbed by any object, such as the despooled portion of the first spoolable medium 20, dragging thereacross. Also, the supporting effect of the overlapping segments may be such that any requirement for end flanges may be minimised or eliminated.

The winding process described above may also be applied in relation to the second and third spoolable media 22, 24 on their respective bobbins 17, 19. However, in the case of the third spoolable media 24, a number of wraps of one end thereof may be formed in the annular recess 110 and/or routed into the cavity 64 (see FIG. 6).

Figure 13:
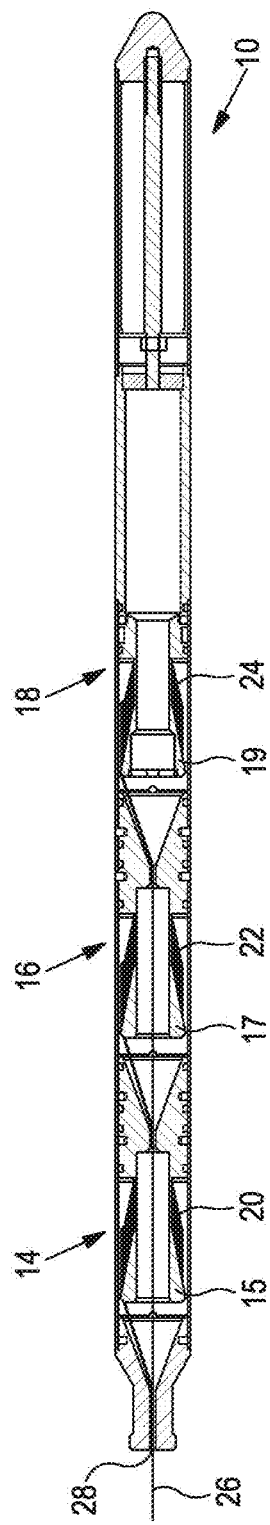
FIG. 13 provides a further cross-sectional view of the through-bore spool apparatus of FIG. 3, with different spoolable media illustrated during deployment.

Reference is now made to FIG. 13 which provides a further longitudinal cross sectional view of the apparatus 10 of FIG. 3, in this case also illustrating the first, second and third spoolable media 20, 22, 24 wound on the respective first, second and third bobbins 15, 17, 19 to form the respective first, second and third spools 14, 16, 18.

As described above, and now also shown in FIG. 13, the third spoolable medium 24 is despooled from the third bobbin 19 and passes, in turn, axially through the second and first bobbins 17, 15, whereas the second spoolable medium 22 is despooled from the second bobbin 17 and passes, together with the third spoolable medium 24, axially through the first bobbin 15. The first spoolable medium 20 is despooled from the first bobbin 15 and combines with the second and third spoolable media 22, 24 to define of form the media bundle 26 which exits the apparatus 10 via the outlet 28.

Figure 14:
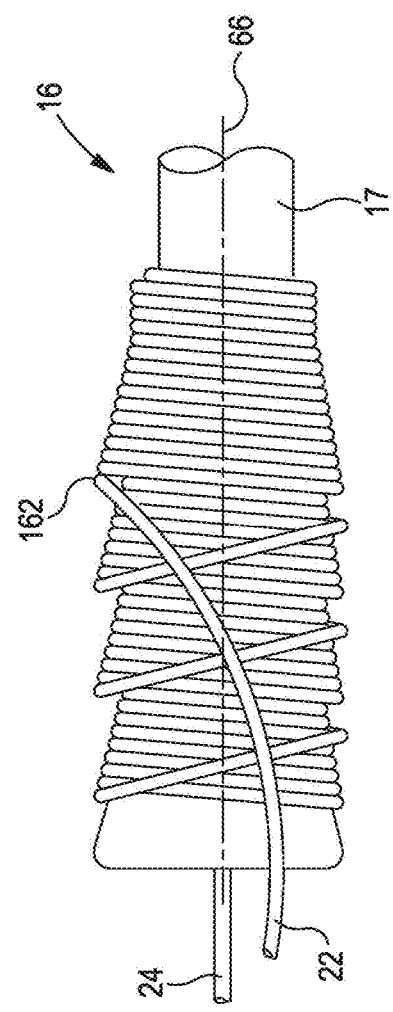
FIG. 14 diagrammatically illustrates the manner of de-spooling of a spoolable medium from a single spool of the apparatus of FIG. 3.

Reference is additionally made to FIG. 14 which shows an end portion of the second spool 16, with the second spoolable media 22 in the process of being despooled, and also illustrating the passage of the third spoolable medium 24. During despooling the wrap layers of one segment are unwound before being unwound from an adjacent wrap segment, and so on. In this way, during despooling the wrap segments are each sequentially depleted, one after the other, in an axial direction, which may be referenced as the depleting direction, along the spool axis 66.

The axial fleeting movement or traverse made by a launch or release point 162 of the second spoolable medium 22 during despooling from an individual wrap layer is limited to the axial length of each individual wrap segment, and not, as conventionally known, the entire axial length of the spool, which may otherwise cause complications, such as from the unwound section of medium 22 effectively dragging across and possibly disturbing the windings still on the spool 16.

In the present example the second bobbin 17 is rotatably fixed within the apparatus 10. In such an arrangement the fibre launch point 162 will orbit the spool 16 during despooling, and as such the second spoolable medium 22 will become spiraled or wound around the third spoolable medium 24. A similar despooling process may be present in relation to the first and third spoolable media 20, 24. In this respect, the first spoolable medium 20 may become spiraled or wrapped around the intertwined second and third spoolable media 22, 24. Such a despooling process may provide a more robust media bundle 26.

Figure 15:
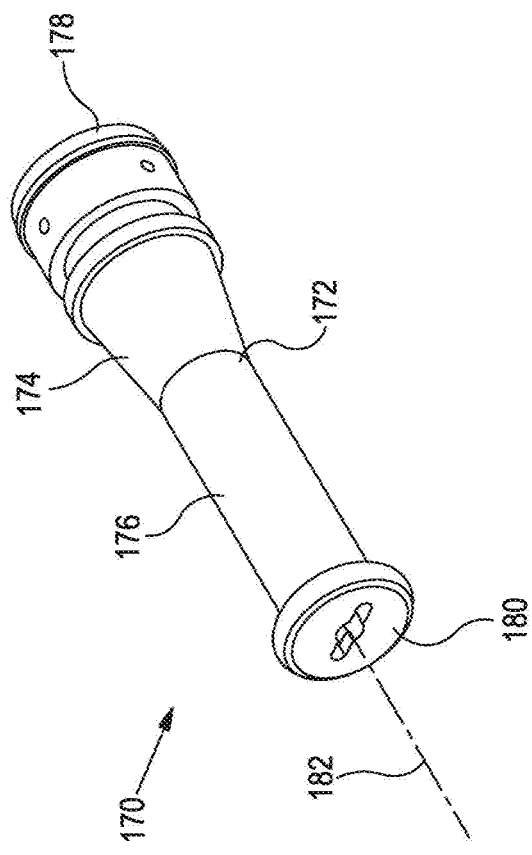
FIG. 15 diagrammatically illustrates an alternative form of bobbin for use within a through-bore spool apparatus.

Reference is now made to FIG. 15 which illustrates an alternative form of bobbin 170 for use within a through-bore spool apparatus, such as apparatus 10. The bobbin 170 is similar in many respects to any one of the first, second and third bobbins 15, 17, 19 described above.

The bobbin 170 includes a winding surface 172 which has a conical portion 174 and an adjacent cylindrical portion 176 for receiving spoolable medium thereon, wherein the conical portion 174 is located towards a proximal end 178 of the bobbin 170 and the cylindrical portion 176 is located towards a distal end 180. The conical portion 174 defines a tapered surface relative to the axis 182 of the bobbin 170, whereas the cylindrical portion 176 defines a parallel surface relative to the bobbin axis 180.

The bobbin 170 further comprises an annular lip 184 at the distal end 180, wherein the annular lip 184 functions to lift a spoolable medium during despooling from the winding surface 172 of the bobbin 170. This may minimise the effect of a helix of spoolable medium during discharge from radially binding against the bobbin 170, which may otherwise provide resistance to discharge, increasing the likelihood of medium breakage. Furthermore, in some examples where a degree of adhesion may be present between the spoolable medium and the bobbin 170 for example caused by the presence of grease, the lifting effect provided by the annular lip 184 may assist to break this adhesion.

Figure 16:
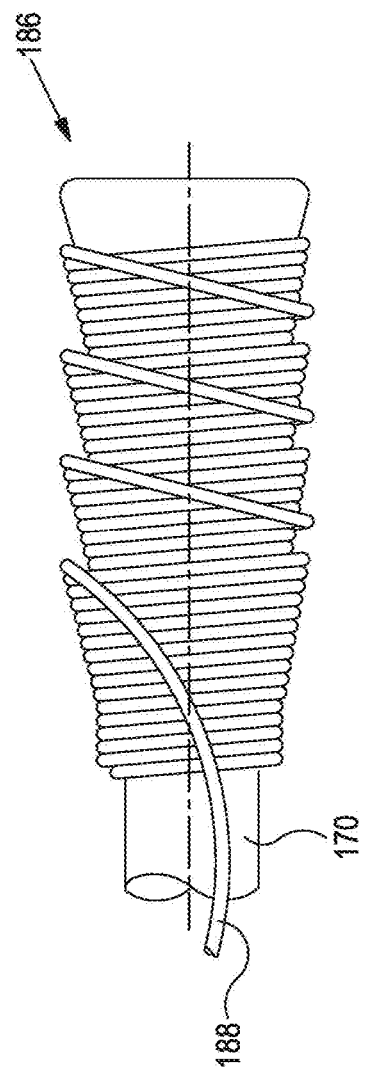
FIG. 16 diagrammatically illustrates a portion of the bobbin of FIG. 15 with a spoolable medium wound thereon.

A spoolable medium may be wound on the bobbin 170 in a similar manner as described above in order to produce a spool 186 as illustrated in FIG. 16, wherein the spool 186 includes the bobbin 170 and wound spoolable medium 188.

Figure 17:
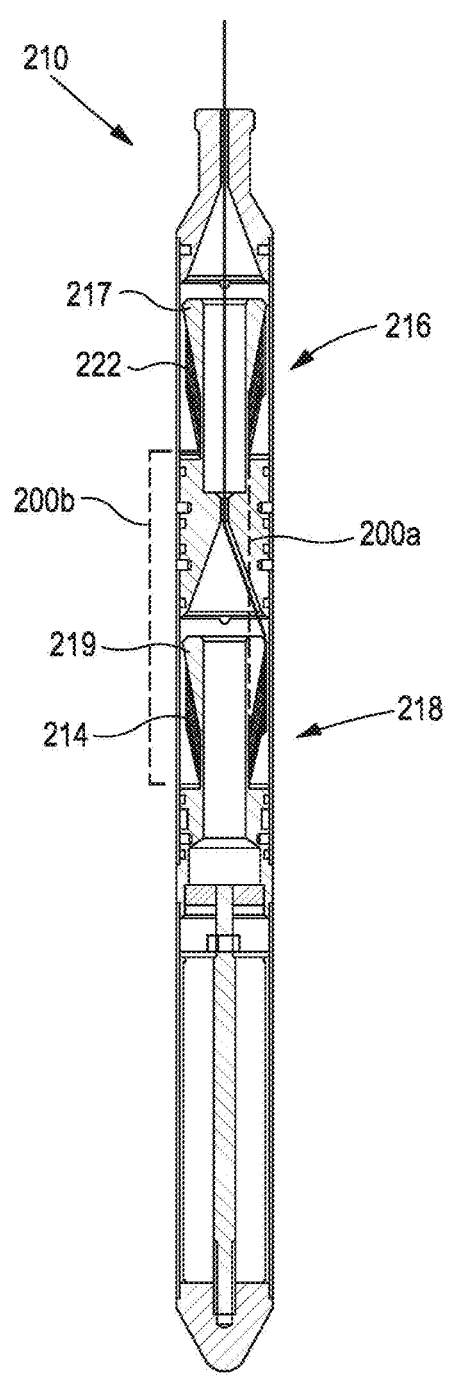
FIG. 17 is a cross sectional view of an alternative through-bore spool apparatus.

An alternative through-bore spool apparatus, generally identified by reference numeral 210, is shown in cross-section in FIG. 17. The apparatus 210 is similar in many respects to apparatus 10, and as such like features share like reference numerals, incremented by 200, and for brevity purposes only the differences will be highlighted. In this respect the apparatus 210 only includes two spools, specifically upper and lower spools 216, 218 each including a bobbin 217, 219 with a common spoolable medium wound thereon. In this example the spoolable medium is defined by a continuous spoolable medium and includes a first portion 222 wound on the first bobbin 217, and a second portion 224 wound on the second bobbin 219, with an interconnecting portion, illustrated by dashed line 200a or dashed line 200b extending therebetween. In this respect dashed line 200a represents an option to internally route the interconnecting portion, whereas dashed line 200b represents an option to externally route at least part of the interconnecting portion. Where externally routing (200b) is provided, some level of protection, such as a conduit, shielding etc. may be provided.

In one example despooling of the continuous spoolable medium may be initiated simultaneously from its opposing ends. Such an arrangement may provide advantages in some applications. For example, some applications, such as communication applications, sensing applications and the like using the deployed spoolable medium, may benefit from having more convenient access (such as surface access) to the opposing ends of the continuous spoolable medium. Furthermore, in some cases effectively having dual deployed strands (e.g., a loop) of the same spoolable medium may provide advantages in sensing sensitivity, resolution benefits and the like.

In some examples the first and second lengths of continuous spoolable medium may be integrally formed. Alternatively, the first and second lengths of continuous spoolable medium may be separately formed and connected together, for example by splicing.

Figure 18:
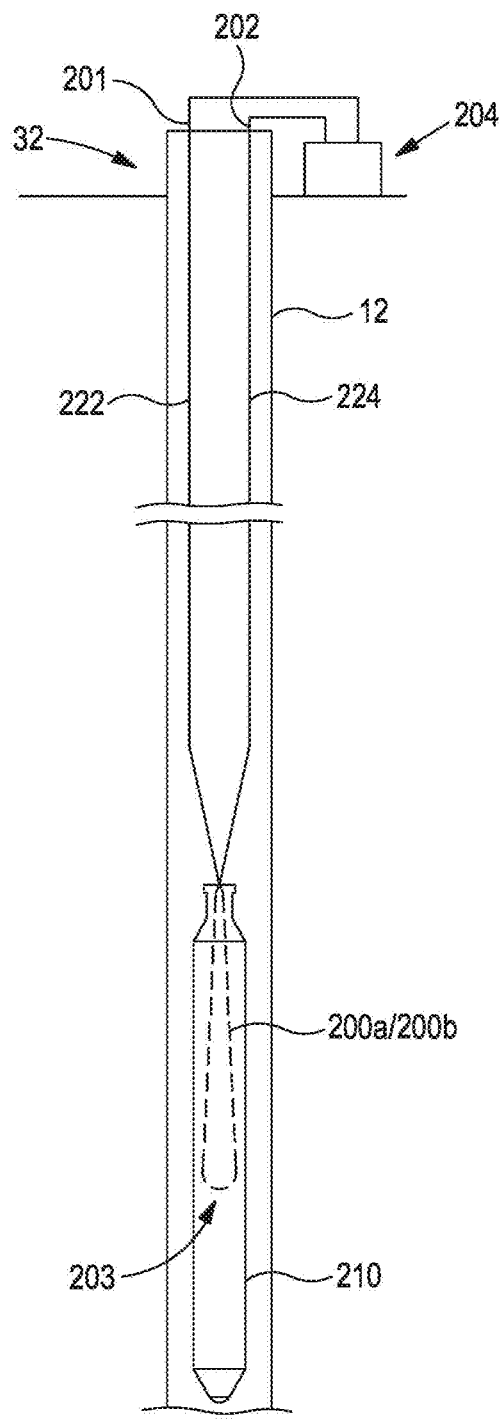
FIG. 18 is a diagrammatic illustration of a through-bore spool apparatus in use deploying a loop of an elongate medium in a bore.

FIG. 18 diagrammatically illustrates the through-bore spool apparatus 210 of FIG. 17 in use deploying a loop of an elongate medium in a wellbore 12. In this respect the opposite ends 201, 202 of the continuous spoolable medium (first and second portions 222, 224) are secured at a surface region 36 such that the first and second portions of the spoolable medium 222, 224 may be simultaneously deployed as the apparatus 210 traverses the wellbore 12, with the interconnecting portion 200a/200b effectively defining a loop 203. It should be recognised that the loop 203 is merely illustrative in FIG. 18, and that in some examples portions of the medium may remain in a wound state.

In one example the spoolable medium may comprise an optical fibre for use in a distributed sensing operation (e.g., DTS, DPS, DAS etc.) within the wellbore 12. In this respect the ends 201, 202 of the spoolable medium may be connected to suitable optical equipment 204 at surface. The installation of a loop of fibre in this example may permit improved sensing operations to be performed, for example by permitting double ended distributed sensing.

Figure 19:
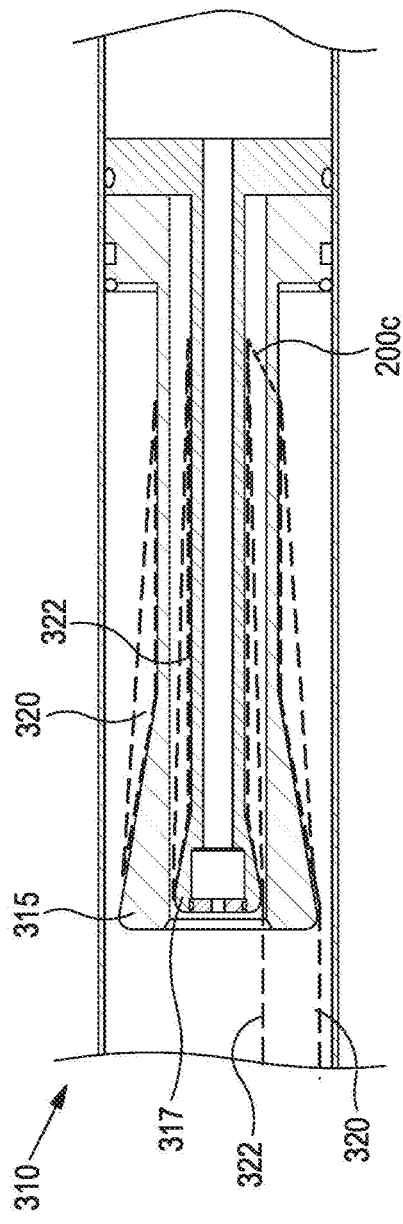
FIG. 19 is a cross-sectional view of a portion of a further alternative through-bore spool apparatus.

An alternative through-bore spool apparatus, generally identified by reference numeral 310, is shown in cross-section in FIG. 19. The apparatus 310, which is only partially shown in FIG. 19, is similar in many respects to apparatus 10, and as such like features share like reference numerals, incremented by 300, and for brevity purposes certain differences will be highlighted.

The apparatus 310 includes first and second bobbins 315, 317 each configured to accommodate respective spoolable media 320, 322 wound thereon. In the present example the first and second bobbins 315, 317 are arranged to be axially nested together, such that the second bobbin 317 at least partially axially extends into the first bobbin 315. Such an arrangement may assist to reduce the axial length of the device.

In some examples the spoolable media 320, 322 may be interconnected in a continuous manner, as illustrated by dashed line 200c. This may permit deployment of a looped medium, for example in the manner illustrated in FIG. 18.

Figure 20:
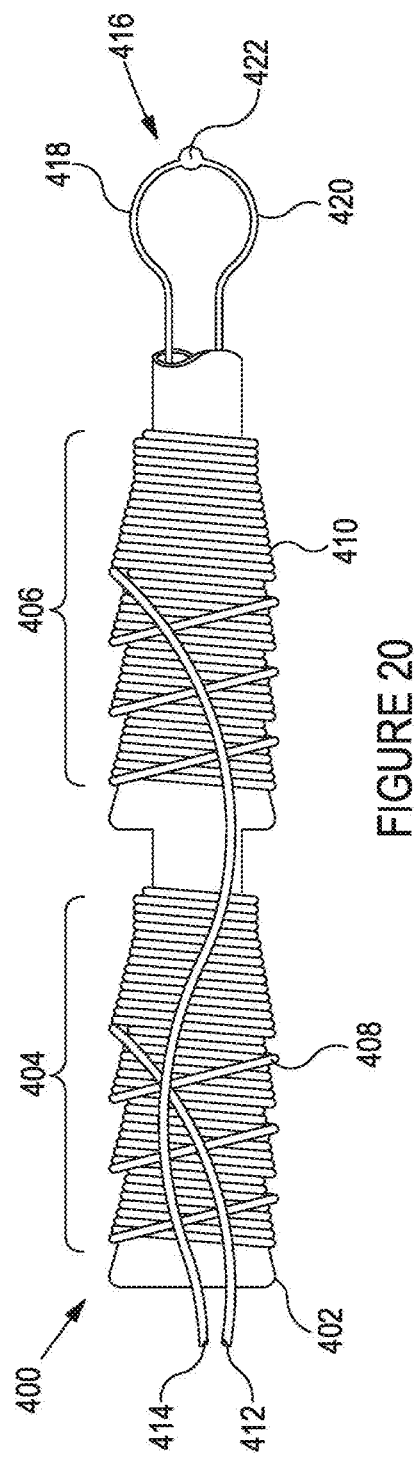
FIG. 20 diagrammatically illustrates a portion of a further alternative through-bore spool apparatus.

FIG. 20 diagrammatically illustrates a spool portion 400 which may be used in a further example of a through-bore spool apparatus. The spool portion 400 includes a bobbin 402 which includes a first winding region 404 and an axially spaced second winding region 406. A first length of elongate medium 408 is wound on the first winding region 404, and a second length of elongate medium 410 is wound on the second winding region 406. The respective media lengths 408, 410 may be wound in accordance with the example sequence of FIGS. 7 to 12. In use, the respective ends 412, 414 of the first and second lengths of elongate media 408, 410 may be despooled simultaneously.

In some examples the first and second lengths of spoolable media 408, 410 may be distinct and separate from each other. However, in other examples, as illustrated, the first and second lengths of spoolable media 408, 410 may be interconnected via an interconnection region 416. In this regard, respective connected end regions 418, 420 of the first and second lengths of spoolable media 408, 410 may be routed internally of the bobbin 402, although options for external routing may also be possible.

In the example illustrated separate lengths of spoolable media 408, 410 are connected together, for example via a splice connection 422. However, in other examples the lengths of spoolable media 408, 410 may be integrally formed.

In the present example the bobbin 402 is of unitary construction. However, in other examples the bobbin 402 may be composed of multiple connected components.

FIG. 21 is a diagrammatic illustration of a further alternative through-bore spool apparatus 510 deployed within a wellbore 12, and FIG. 22 provides a top elevation view of the apparatus 510. In this example the apparatus 510 includes three (although other examples may have more or less) housing modules 512, 514, 516 which are secured together via banding 518 or other suitable means. Each housing module 512, 514, 516 contains a spool (not illustrated) which carries a respective spoolable medium 520, 522, 524 which is despooled and exits the respective housing 512, 514, 516 to form a media bundle 526 which becomes deployed within the wellbore 12. In some examples at least one, some or each of the housings 512, 514, 516 may comprise multiple spools. For example, at least one, some or each housing 512, 514, 516 may be provided in accordance with any of the other example apparatus 10, 210, 310 described above, and/or may include any form of spool/bobbin arrangement.

Figure 24:
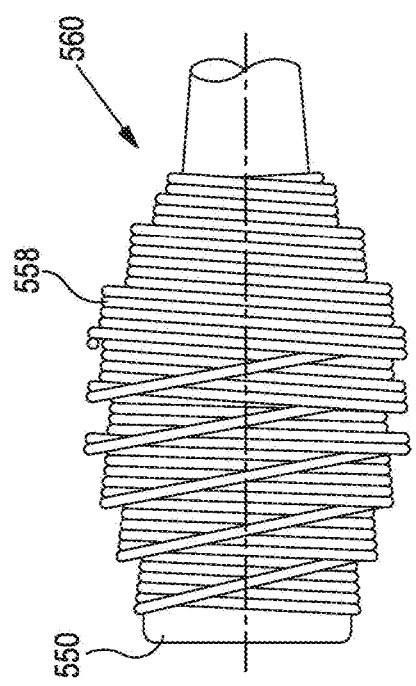
FIG. 24 illustrates the bobbin of FIG. 23 with a spoolable medium wound thereon.
Figure 23:
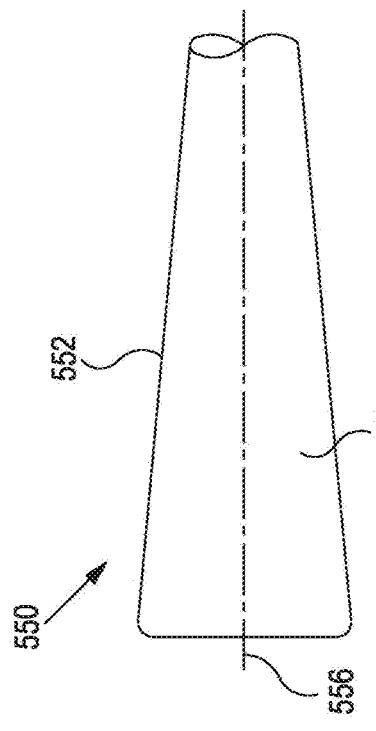
FIG. 23 is a diagrammatic illustration of an alternative form of bobbin for use within a through-bore spool apparatus.

In the examples provided above the bobbins include a winding surface having both conical and cylindrical portions. However, other forms of bobbin may be provided, an example of which is shown in FIG. 23. In this respect the example bobbin 550 includes a winding surface 552 which includes only a conical portion 554 with a tapering surface relative to the bobbin axis 556. A spoolable medium 558 is shown wound on the bobbin 550 to form a spool 560 in FIG. 24. In this respect the spoolable medium 558 is wound in a similar manner to that described in relation to FIGS. 7 to 12, thus forming multiple overlapping wrap segments.

Figure 26:
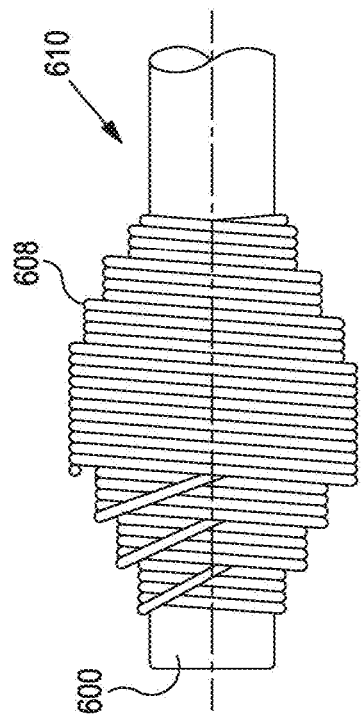
FIG. 26 illustrates the bobbin of FIG. 25 with a spoolable medium wound thereon.
Figure 25:
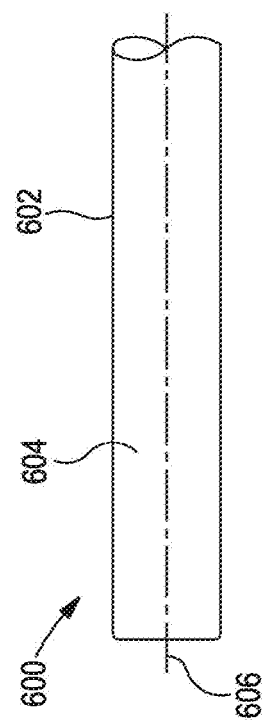
FIG. 25 is a diagrammatic illustration of an alternative form of bobbin for use within a through-bore spool apparatus.

A further alternative bobbin 600 is illustrated in FIG. 25 and includes a winding surface 602 which includes only a cylindrical portion 604 with its surface parallel to the bobbin axis 606. A spoolable medium 608 is shown wound on the bobbin 600 to form a spool 610 in FIG. 26. In this respect the spoolable medium 608 is wound in a similar manner to that described in relation to FIGS. 7 to 12, thus forming multiple overlapping wrap segments.

It should be understood that the examples provided are merely exemplary of the present disclosure, and that various modifications may be made thereto.

The invention claimed is:

1. A through-bore spool apparatus for use in deploying multiple spoolable media in a bore, the through-bore spool apparatus comprising:
   a first spool comprising a first spool axis and a first spoolable medium wound around the first spool axis; and
   a second spool comprising a second spool axis and a second spoolable medium wound around the second spool axis;
   wherein the first and second spoolable media are de-spoolable simultaneously from the respective first and second spools during movement of the through-bore spool apparatus along a bore, and
      wherein the first and second spoolable media are de-spoolable simultaneously from a common side of the through-bore spool apparatus.

2. The through-bore spool apparatus according to claim 1, wherein the second spool is arranged on one axial side of the first spool.

3. The through-bore spool apparatus according to claim 1, wherein the second spoolable medium extends axially through the first spool from one side of the first spool to the other.

4. The through-bore spool apparatus according to claim 1, wherein the first spool defines an axial passage to accommodate the second spoolable medium to pass therethrough.

5. The through-bore spool apparatus according to claim 1, comprising a third spool comprising a third spool axis and a third spoolable medium wound around the third spool axis, wherein at least one of:
   the third spool is arranged on one axial side of the second spool;
   the first, second and third spools are axially arranged with the second spool axially interposed between the first and third spools; and
   the third spoolable medium extends axially through the second spool, and the second and third spoolable media extends axially through the first spool.

6. The through-bore spool apparatus according to claim 1, wherein the first and second spoolable media form a media bundle which extends from the through-bore spool apparatus.

7. The through-bore spool apparatus according to claim 1, wherein at least one of the first and second spool apparatus is for use in at least one of distributed temperature sensing (DTS), distributed pressure sensing (DPS) and distributed acoustic sensing (DAS).

8. The through-bore spool apparatus according claim 1, wherein at least one of the first and second spoolable media comprises at least one of an optical fibre, an electrical conductor and a strength member.

9. The through-bore spool apparatus according to claim 1, wherein the first and second spoolable media are defined by separate lengths of unconnected media.

10. The through-bore spool apparatus according to claim 1, wherein the first and second spoolable media are defined by a continuous spoolable medium, with a first length of the continuous spoolable medium wound on the first spool, and a second length of the continuous spoolable medium may be wound on the second spool.

11. The through-bore spool apparatus according to claim 10, wherein the first and second lengths of the continuous spoolable medium are deployable simultaneously to form a loop of elongate medium in the bore.

12. The through-bore spool apparatus according to claim 1, wherein both the first and second spools comprise a bobbin upon which the associated spoolable media is wound.

13. The through-bore spool apparatus according to claim 12, wherein the first and second spools comprise respective bobbins.

14. The through-bore spool apparatus according to claim 12, wherein the first and second spools comprise a single bobbin which accommodates both the first and second spoolable media, the single bobbin defining separate winding regions to accommodate discrete winding of the first and second spoolable media thereon.

15. The through-bore spool apparatus according to claim 1, comprising a housing, wherein at least one of the first and second spools is mounted within the housing.

16. The through-bore spool apparatus according to claim 1, wherein at least one of the first and second spoolable media is wound on a respective spool to form a plurality of wrap segments arranged axially along the respective spool axis, wherein adjacent wrap segments partially overlap in the axial direction.

17. The through-bore spool apparatus according to claim 16, wherein each wrap segment comprises a first wrap layer wound in a first axial direction over a first axial distance, and a second wrap layer wound over the first wrap layer in a reverse second axial direction over a second axial distance greater than the first axial distance, the spoolable medium extending from the second wrap layer of one wrap segment to the first wrap layer of an adjacent wrap segment.

18. A method for deploying multiple spoolable media within a bore, comprising:
   locating a through-bore spool apparatus within the bore, wherein the through-bore spool apparatus comprises a first spool comprising a first spoolable medium and a second spool comprising a second spoolable medium; and
   moving the through-bore spool apparatus through the bore while simultaneously de-spooling the first and second spoolable media from the respective first and second spools from a common side of the through-bore spool apparatus.

19. A method for deploying a loop of a spoolable medium within a bore, comprising:
locating a through-bore spool apparatus within the bore, wherein the through-bore spool apparatus comprises:
a first spool comprising a first length of the spoolable medium wound thereon, the first length of the spoolable medium comprising a first end of the spoolable medium; and
a second spool comprising a second length of the spoolable medium thereon, wherein the second length of the spoolable medium comprises a second end of the spoolable medium a second spool; and
moving the through-bore spool apparatus through the bore while simultaneously de-spooling the first and second ends of the spoolable medium from the respective first and second spools from a common side of the through-bore spool apparatus to form a loop.

* * * * *